United States Patent
Tsuburaya et al.

(10) Patent No.: US 9,076,986 B2
(45) Date of Patent: Jul. 7, 2015

(54) GAS BARRIER LAMINATE AND CIRCULARLY POLARIZING PLATE

(75) Inventors: Manabu Tsuburaya, Tokyo (JP); Hiroyasu Inoue, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 262 days.

(21) Appl. No.: 13/636,537

(22) PCT Filed: Mar. 23, 2011

(86) PCT No.: PCT/JP2011/057043
§ 371 (c)(1),
(2), (4) Date: Sep. 21, 2012

(87) PCT Pub. No.: WO2011/118661
PCT Pub. Date: Sep. 29, 2011

(65) Prior Publication Data
US 2013/0021667 A1   Jan. 24, 2013

(30) Foreign Application Priority Data
Mar. 25, 2010   (JP) .................. 2010-070943

(51) Int. Cl.
*G02B 5/30* (2006.01)
*H01L 51/52* (2006.01)
(Continued)

(52) U.S. Cl.
CPC ............ *H01L 51/5253* (2013.01); *B32B 27/08* (2013.01); *B32B 2255/10* (2013.01); *B32B 2255/20* (2013.01); *B32B 2457/00* (2013.01);
(Continued)

(58) Field of Classification Search
CPC .... H01L 51/5253; B32B 27/08; B32B 27/16; B32B 27/325; B32B 2255/10; B32B 2255/20; B32B 2457/00; B32B 2307/7242; B32B 38/0008; B32B 2309/02; B32B 2309/12; G02B 27/286; G02B 5/30; G02F 1/133528; G02F 2001/133541
USPC ..................................................... 359/489.07
See application file for complete search history.

(56) References Cited

U.S. PATENT DOCUMENTS 6,335,479 B1   1/2002   Yamada et al.
7,998,563 B2 *   8/2011   Yoshihara et al. ............ 428/212
(Continued)

FOREIGN PATENT DOCUMENTS

EP   1 768 463 A1   3/2007
JP   2000-332275 A   11/2000
(Continued)

OTHER PUBLICATIONS

International Search Report for PCT/JP2011/057043 dated Jun. 14, 2011.

*Primary Examiner* — Frank Font
(74) *Attorney, Agent, or Firm* — Birch, Stewart, Kolasch & Birch, LLP

(57) ABSTRACT

A gas barrier multilayer body including a composite layer A which has a film (a) and an inorganic barrier layer (a), and a composite layer B which has an alicyclic olefin resin film (b) and an inorganic barrier layer (b), wherein a surface of the composite layer A and a surface of the composite layer B are faced and bonded to each other, a surface of the alicyclic olefin resin film (b) on a side facing to the composite layer A is an activation-treated surface, and the activation-treated surface of the alicyclic olefin resin film (b) is in contact with the composite layer A directly or via a metal alkoxide layer (b); and a circularly polarizing plate including the same.

23 Claims, 5 Drawing Sheets

(51) Int. Cl.
  *B32B 27/08* (2006.01)
  *G02B 27/28* (2006.01)
  *B32B 27/16* (2006.01)
  *B32B 27/32* (2006.01)
  *G02F 1/1335* (2006.01)
  *B32B 38/00* (2006.01)

(52) U.S. Cl.
  CPC ............ *G02B 5/30* (2013.01); *G02F 1/133528* (2013.01); *G02F 2001/133541* (2013.01); *G02B 27/286* (2013.01); B32B 27/16 (2013.01); B32B 27/325 (2013.01); *B32B 2307/7242* (2013.01); *B32B 38/0008* (2013.01); *B32B 2309/02* (2013.01); *B32B 2309/12* (2013.01)

(56) References Cited

U.S. PATENT DOCUMENTS

| | | | |
|---|---|---|---|
| 8,057,875 B2 * | 11/2011 | Noda et al. | 428/36.9 |
| 8,194,210 B2 * | 6/2012 | Suzuki et al. | 349/96 |
| 8,208,197 B2 * | 6/2012 | Asakura et al. | 359/361 |
| 2002/0050287 A1 | 5/2002 | Yamada et al. | |
| 2003/0051751 A1 | 3/2003 | Yamada et al. | |
| 2004/0229394 A1 | 11/2004 | Yamada et al. | |
| 2007/0241673 A1 | 10/2007 | Yamada et al. | |
| 2009/0109536 A1 * | 4/2009 | Fukuda et al. | 359/580 |
| 2009/0237786 A1 * | 9/2009 | Yoshihara et al. | 359/488 |
| 2009/0317592 A1 * | 12/2009 | Yoshitomi et al. | 428/142 |
| 2010/0215943 A1 * | 8/2010 | Shinohara et al. | 428/313.5 |

FOREIGN PATENT DOCUMENTS

| | | |
|---|---|---|
| JP | 2002-156524 A | 5/2002 |
| JP | 2004-219825 A | 8/2004 |
| JP | 2005-327687 A | 11/2005 |
| JP | 2006-1156 A | 1/2006 |
| JP | 2009-178956 A | 8/2009 |
| JP | 2009-190186 A | 8/2009 |

* cited by examiner

GAS BARRIER LAMINATE AND CIRCULARLY POLARIZING PLATE

FIELD

The present invention relates to a gas barrier multilayer body and a circularly polarizing plate including the same.

BACKGROUND

It is known that, in a liquid crystal display device, a display device which has an organic electroluminescent element (hereinafter, sometimes referred to as an "organic EL element"), a light source device, an organic solar cell, and a dye-sensitized solar cell, a gas barrier layer having a function of preventing transmission of moisture and oxygen is used for the purpose of, e.g., protecting an element constituting the device.

As such a gas barrier layer, a material having a low moisture permeability (a ratio of transmitting moisture) is preferable. As such a material, a resin containing an alicyclic olefin and a variety of inorganic materials are known. In a gas barrier layer having such a material, a thick layer of an inorganic material increases gas barrier performance. However, provision of one thick layer may reduce flexibility, durability, and the like. Therefore, there has been proposed a gas barrier multilayer body having a multilayer structure in which a plurality of resin layers and a plurality of relatively thin inorganic material layers are formed in an alternating manner (for example, Patent Literatures 1 and 2).

CITATION LIST

Patent Literature

Patent Literature 1: Japanese Patent Application Laid-Open No. 2009-190186 A
Patent Literature 2: Japanese Patent Application Laid-Open No. 2005-327687 A (corresponding European Patent Application Publication No. EP1768463 (A1))

SUMMARY

Technical Problem

In cases where a plurality of inorganic material layers are formed in an alternating manner by a method such as vapor deposition, it is necessary to perform a process for forming the layers under a high vacuum environment. However, in such an alternate layer-forming operation, an outgas from the resin layer may hinder a vapor deposition operation or cause damage to the quality of the deposited layer, whereby gas barrier performance is degraded in many cases.

As another conceivable measure for obtaining a multilayer body having a plurality of inorganic material layers, there is a method in which a plurality of films each having a single inorganic material layer are prepared, and these films are then bonded via an adhesive. However, the multilayer body obtained by such a method has poor durability due to low durability of the adhesive layer, a difference in the thermal expansion coefficient and the humidity expansion coefficient between the layer containing an alicyclic olefin resin and the adhesive layer, and the like. Therefore gas barrier performance thereof under a high temperature and high humidity environment is likely to deteriorate with the lapse of time.

If the alicyclic olefin resin layer can be configured as a layer having a function that the device is required to have other than a gas barrier function, such as a function of adjusting phase differences, such a layer is desirable in terms of reducing thickness of the entire device, improving durability of the entire device over time under a high temperature and high humidity environment, simplifying a manufacturing process, reducing a manufacturing cost, and the like.

Therefore, an object of the present invention is to provide a gas barrier multilayer body that has excellent gas barrier performance, has limited degradation of gas barrier performance even under a high temperature and high humidity environment, and can be manufactured easily. Another object of the present invention is to provide a circularly polarizing plate that can be manufactured easily, has an excellent function as a gas barrier layer as well, and can realize a reduced thickness of the entire device.

Solution to Problem

The inventors have made extensive studies in order to solve the aforementioned problems. As a result, the inventors have found out that the problems can be solved by a gas barrier multilayer body which is obtained by bonding of a composite layer having an alicyclic olefin resin layer and an inorganic barrier layer in a certain structure, to thereby complete the present invention.

That is, according to the present invention, the following is provided.

[1] A gas barrier multilayer body comprising a composite layer A which has a film (a) and an inorganic barrier layer (a), and a composite layer B which has an alicyclic olefin resin film (b) and an inorganic barrier layer (b), wherein a surface of the composite layer A and a surface of the composite layer B are faced and bonded to each other, a surface of the alicyclic olefin resin film (b) on a side facing to the composite layer A is an activation-treated surface, and the activation-treated surface of the alicyclic olefin resin film (b) is in contact with the composite layer A directly or via a metal alkoxide layer (b).

[2] The gas barrier multilayer body according to [1], wherein the composite layer B further has the metal alkoxide layer (b) disposed in contact with the activation-treated surface of the alicyclic olefin resin film (b), and the activation-treated surface of the alicyclic olefin resin film (b) is in contact with the composite layer A via the metal alkoxide layer (b).

[3] The gas barrier multilayer body according to [1] or [2], wherein the composite layer A and the composite layer B are bonded by thermo-compression bonding.

[4] The gas barrier multilayer body according to any one of [1] to [3], wherein the composite layer A has a metal alkoxide layer (a) disposed in contact with an activation-treated surface of the film (a) or the inorganic barrier layer (b), and a surface of the composite layer A on a side facing to the composite layer B is a surface of the metal alkoxide layer (a).

[5] The gas barrier multilayer body according to any one of [1] to [4], wherein the surface of the composite layer A on a side facing to the composite layer B is the activation-treated surface of the film (a) or the inorganic barrier layer (b).

[6] The gas barrier multilayer body according to any one of [1] to [5], wherein the activation-treated surface is a surface which has been subjected to a treatment selected from a group consisting of plasma treatment, UV ozone treatment, and corona treatment.

[7] The gas barrier multilayer body according to any one of [1] to [6], wherein the film (a) of the composite layer A is a film composed of an alicyclic olefin resin.

[8] The gas barrier multilayer body according to any one of [1] to [7], wherein one or both of the film (a) and the alicyclic olefin resin film (b) is/are a stretched film.

[9] The gas barrier multilayer body according to [8], wherein one or both of the film (a) and the alicyclic olefin resin film (b) is/are a quarter wave plate.

[10] The gas barrier multilayer body according to [9], wherein one of the film (a) and the alicyclic olefin resin film (b) is a quarter wave plate, the other thereof is a half wave plate, and an intersection angle between a slow axis of the quarter wave plate and a slow axis of the half wave plate is 57° to 63°.

[11] A circularly polarizing plate comprising the gas barrier multilayer body according to any one of [1] to [10] and a polarizer.

Advantageous Effects of Invention

Since the gas barrier multilayer body of the present invention has a plurality of inorganic barrier layers and an alicyclic olefin resin film, the gas barrier multilayer body has excellent gas barrier performance. In addition, since these are stacked in a certain structure, degradation of gas barrier performance is suppressed even under a high temperature and high humidity environment, and manufacturing can be easily performed. Therefore, the gas barrier multilayer body of the present invention can be usefully employed as a gas barrier layer in a device such as a liquid crystal display device, a display device which has an organic EL device, a light source device, an organic solar cell, and a dye-sensitized solar cell.

The circularly polarizing plate of the present invention, which includes the aforementioned gas barrier multilayer body of the present invention in addition to a polarizer, can be usefully employed as a circularly polarizing plate additionally having an excellent function as a gas barrier layer, particularly in a device such as a liquid crystal display device, a display device which have an organic EL device, and a light source device.

DESCRIPTION OF EMBODIMENTS

Figure 1:
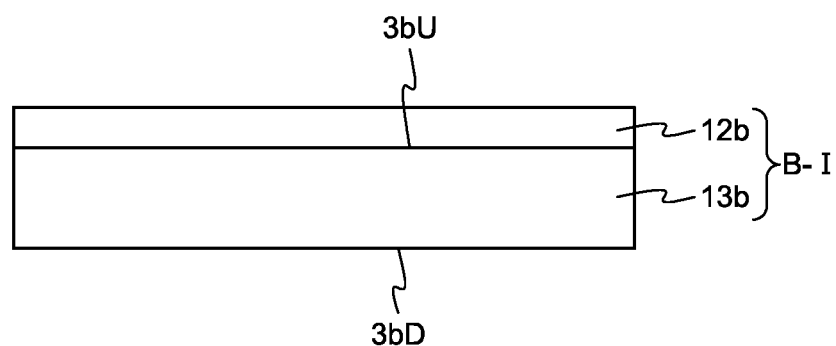
FIG. 1 is a cross-sectional view schematically showing an example of a concrete structure of a composite layer B constituting the gas barrier multilayer body of the present invention.

The present invention will be described in detail referring to embodiments and examples. However, the present invention is not limited to the embodiments and the examples, and may be arbitrarily modified for implementation without departing from the scope of the claims of the present invention and equivalents thereof.

The gas barrier multilayer body of the present invention includes a composite layer A having a film (a) and an inorganic barrier layer (a), and a composite layer B having an alicyclic olefin resin film (b) and an inorganic barrier layer (b). Furthermore, each of the composite layers A and B may have a metal alkoxide layer as an optional component.

[Alicyclic Olefin Resin Film (b)]

In the alicyclic olefin resin film (b) constituting the gas barrier multilayer body (b) of the present invention, the alicyclic olefin resin is a resin which contains an alicyclic olefin polymer and, if necessary, another optional component.

The alicyclic olefin polymer is an amorphous thermoplastic polymer having an alicyclic structure in a main chain and/or a side chain. Examples of the alicyclic structure in the alicyclic olefin polymer may include a saturated alicyclic hydrocarbon (cycloalkane) structure and an unsaturated alicyclic hydrocarbon (cycloalkene) structure. The cycloalkane structure is preferable in terms of mechanical strength, heat resistance, and the like. The number of carbon atoms constituting the alicyclic structure is not specifically limited. The number of carbon atoms is normally 4 to 30, preferably 5 to 20, and more preferably 5 to 15. In such a case, properties of mechanical strength, heat resistance, and film formability are highly balanced, which is preferable.

The ratio of a repeating unit having an alicyclic structure constituting the alicyclic olefin polymer is preferably 55 percent by weight or higher, further preferably 70 percent by weight or higher, and particularly preferably 90 percent by weight or higher. The ratio of the repeating unit having an alicyclic structure in an alicyclic olefin polymer in this range is preferable in terms of transparency and heat resistance.

Examples of the alicyclic olefin polymer may include a norbornene polymer, a monocyclic olefin polymer, a cyclic conjugate diene polymer, a vinyl alicyclic hydrocarbon polymer, and hydride thereof. Among these, a norbornene polymer has a favorable transparency and formability, and therefore can be suitably used.

Examples of the norbornene polymer may include a ring-opened polymer of a monomer having a norbornene structure, a ring-opened copolymer of a monomer having a norbornene structure and another monomer, or a hydride thereof; and an addition polymer of a monomer having a norbornene structure, an addition copolymer of a monomer having a norbornene structure and another monomer, or a hydride thereof. Among these, the ring-opened (co)polymer hydride of a monomer having a norbornene structure may be particularly suitably used in terms of transparency, formability, heat resistance, low hygroscopicity, size stability, lightweight properties, and the like.

The alicyclic olefin resin may contain, as an alicyclic olefin polymer, only one species of these polymers alone, or two or more species of these polymers in combination at any ratio. The film (b) may also have a layered structure of various species of alicyclic olefin resins each of which forms a layer.

The molecular weight of the alicyclic olefin polymer contained in the alicyclic olefin resin is appropriately selected in accordance with the intended use, and is normally 10,000 or higher, preferably 15,000 or higher, and more preferably 20,000 or higher, and normally 100,000 or lower, preferably 80,000 or lower, and more preferably 50,000 or lower as a weight mean molecular weight (Mw) in terms of polyisoprene (when the solvent is toluene, in terms of polystyrene) measured by gel permeation chromatography using cyclohexane (in a case where the polymer does not dissolve in cyclohexane, toluene may be used) as a solvent. By setting the weight mean molecular weight within such a range, mechanical strength, molding processability and the like of the obtained substrate film are highly balanced, which is preferable.

Examples of the optional component which may be contained in the alicyclic olefin resin may include the known additives such as antioxidants, thermal stabilizers, photostabilizers, ultraviolet absorbers, antistatic agents, dispersants, chlorine scavenging agents, flame retardants, nucleating agents, toughening agents, anti-blocking agents, anti-fogging agents, release agents, pigments, organic or inorganic fillers, neutralizing agents, slip additives, decomposers, metal inactivating agents, antifouling materials, antibacterial agents, other resins and thermoplastic elastomers.

The amount of these additives may be set within a range by which the effect of the present invention is not impaired. For example, the amount of the additives is normally 0 to 50 parts by weight, and preferably 0 to 30 parts by weight with respect to 100 parts by weight of a polymer contained in a resin A.

The alicyclic olefin resin is not necessarily limited to a resin having a high transparency. However, a resin having a high transparency is preferable since thereby the gas barrier multilayer body of the present invention can be advantageously used in a portion of a display device, a light source device or a solar cell, as a component thereof that has to be light transmissible. For example, it is preferable that the alicyclic olefin resin has a transparency in which the total light transmittance measured using a test piece having a thickness of 1 mm of the alicyclic olefin resin is normally 70% or higher, preferably 80% or higher, and more preferably 90% or higher.

[Film (a)]

The film (a) constituting the gas barrier multilayer body of the present invention may be an alicyclic olefin resin film similar to the aforementioned film (b), or a film consisting of another material. The alicyclic olefin resin film similar to the film (b) is preferable in terms of, e.g., a favorable gas barrier performance, and a small difference in physical properties from those of the film (a) which suppresses warping.

Examples of the resin other than the alicyclic olefin resin which may be used as a material of the film (a) may include a resin such as polyethylene terephthalate, polyethylene naphthalate, polybutylene terephthalate, polycarbonate, fluorene-modified polycarbonate, alicyclic-modified polycarbonate, polymethyl methacrylate, methacryl-maleimide copolymer, polystyrene, triacetyl cellulose, polyether sulfone, polysulfone, polyimide, polyetherimide, and polyamide.

The film (a) may contain only one species of these resins alone, or may contain two or more species of these resins in combination at any ratio. The film (a) may also have a layered structure of various species of resins each of which forms a layer.

[Film; Stretching]

The film (a) and/or the film (b) may preferably be a stretched film. Stretching of the film can suppress the thermal expansion coefficient, thereby further reducing the degradation of gas barrier performance under a high temperature and high humidity environment.

Such a stretched film may be obtained by shaping a resin such as the those enumerated as the examples of the material of the films (a) and (b) listed above into a raw film, and stretching such a raw film.

The shape of such a raw film may be appropriately set so that a desired stretching magnification ratio gives a substrate film having a desired size. Preferably, the raw film may have a lengthy film shape.

The mode of the stretching may preferably be biaxial stretching. Such biaxial stretching may be performed by stretching the raw film in two directions which are parallel to the surface thereof and are orthogonal to each other. The directions which are "orthogonal" preferably form an angle of 90°. Such an angle may also have a tolerance of approximately ±10°.

Normally, the two directions which are orthogonal to each other are set along the MD direction of the lengthy film (the film flow direction, that is a length direction of the lengthy film) and along the TD direction of the lengthy film (the width direction of the film, which is orthogonal to the MD direction), respectively. However, the two directions are not limited to these directions, and may be two directions which are orthogonal to each other and oblique to the MD and TD directions.

The mode of the biaxial stretching may be sequential biaxial stretching (in which each of the stretching steps in two directions is performed as a separate step), or simultaneous biaxial stretching (in which at least part of the stretching steps in two directions are simultaneously performed). In terms of manufacturing efficiency, the simultaneous biaxial stretching is preferable. However, when each of the stretching steps in two directions needs to be controlled independently and precisely, such as when an Re value is required to be as low as possible, the sequential biaxial stretching may be preferable in order to facilitate such a control.

A preferable stretching magnification of the biaxial stretching in each of two directions is preferably 1.05 to 4.5 times, and more preferably 1.5 to 3.5 times. The ratio of the magnification between the two directions is preferably within a range of 1:1 to 2:1, in order to minimize a change in moisture permeability under a high temperature and high humidity environment and to realize uniform light transmission through the gas barrier multilayer body.

The temperature during the biaxial stretching may be appropriately set based on the Tg (glass transition temperature) of the raw film. Specifically, for example, the temperature may be in a range of the Tg or higher and Tg+30° C. or lower, and more preferably in a range of the Tg or higher and Tg+20° C. or lower. When the raw film is a multilayer film composed of an alicyclic olefin resin layer and another resin layer, the Tg of the alicyclic olefin resin may be taken as the Tg of the raw film. When the raw film has layers of a plurality of alicyclic olefin resin species each having a different Tg, the Tg of the alicyclic olefin resin layer having the lowest Tg may be taken as a Tg of the raw film.

Preferable examples of the apparatus used for performing biaxial stretching may include a tenter stretching machine, and other stretching machines having a guide rail and grippers moving along the guide rail. In addition thereto, any other stretching machines such as a lengthwise uniaxial stretching machine, a bubble stretching machine, a roller stretching machine may also be used.

[Physical Properties of Film]

One or both of the film (a) and the film (b) may be a quarter wave plate. In a preferable embodiment, one of the film (a) and the film (b) may be a quarter wave plate, and the other may be a half wave plate. An intersection angle of the slow axis of the quarter wave plate and the slow axis of the half wave plate may be 57° to 63°. The gas barrier multilayer body with such properties may also be used as a component of a circularly polarizing plate. A wavelength range in which the film (a) and/or the film (b) can exhibit the properties as a quarter wave plate or a half wave plate may be appropriately selected in accordance with the use thereof. The wavelength range may be, e.g., around 550 nm which is the center of a visible light wavelength.

The thickness of each of the film (a) and the film (b) may be preferably 10 μm to 500 μm, and more preferably 30 μm to 250 μm. The thickness of the film may be measured by a contact film thickness meter. Specifically, the thickness may be measured at 10 points equally spaced on a line parallel to the TD direction, and a mean value thereof may be calculated. The calculated mean value may be taken as a measured value of the thickness.

Although the physical properties of the films (a) and (b) other than the aforementioned properties are not specifically limited, the thermal expansion coefficient is preferably 70 ppm/k or lower, more preferably 50 ppm/k or lower, and further preferably 40 ppm/k or lower, and the humidity expansion coefficient is preferably 30 ppm/RH, more preferably 10 ppm/RH, and further preferably 1.0 ppm/RH. The thermal expansion coefficient may be a value measured by using a 20 mm×5 mm film as a sample piece to measure elongation of the length of the sample piece when the temperature is increased from 30° C. to 130° C. under the conditions of a load of 5.0 g, nitrogen of 100 cc/min, and a temperature increase rate of 0.5° C./min. The humidity expansion coefficient may be a value measured by using a 20 mm×5 mm film as a sample piece to measure elongation of the length of the sample piece when the humidity is increased from 30% RH to 80% RH under the conditions of a load of 5.0 g, nitrogen of 100 cc/min, a temperature of 25° C., and a speed of 5.0% RH/min. As a result of achieving such a preferable thermal expansion coefficient and humidity expansion coefficient, a gas barrier multilayer body in which reduction of gas barrier performance with the lapse of time under a high temperature and high humidity environment is inhibited can be obtained.

[Inorganic Barrier Layers (a) and (b)]

The inorganic barrier layers (a) and (b), which the gas barrier multilayer body of the present invention includes, are layers that contain an inorganic material as a main component and that can provide barrier ability against a component such as moisture and oxygen present in the outside air which can degrade a component inside the device such as a display device and a light emitting device (e.g., a light emitting layer of an organic EL device, and the like).

The upper limit of a moisture vapor transmission rate of the inorganic barrier layer is preferably 1.0 g/m$^2$·day or lower, and more preferably 0.2 g/m$^2$·day or lower. On the other hand, the lower limit of the moisture vapor transmission rate is the most preferably 0 g/m$^2$·day. However, the inorganic barrier layer can preferably function even if the moisture vapor transmission rate is 0 g/m$^2$·day or higher, as long as the moisture vapor transmission rate is within a range equal to or lower than the aforementioned upper limit.

The material of the inorganic barrier layers is not specifically limited. Preferable examples of the material may include: an oxide, a nitride, and a nitride oxide of silicon; an oxide, a nitride, and a nitride oxide of aluminum; a DLC (diamond-like carbon); and a mixed material of two or more thereof. In terms of transparency, an oxide and a nitride oxide of silicon is particularly preferable. On the other hand, in terms of compatibility with the alicyclic olefin resin which is a material of the substrate film, a DLC is particularly preferable.

Examples of the oxide, the nitride, and the nitride oxide of silicon may include SiOx (1.4<x<2.0 is preferable for achieving both transparency and water vapor barrier properties), SiNy (0.5<y<1.5 is preferable for achieving both transparency and water vapor barrier properties), SiOxNy (when improvement in adhesiveness is important, it is preferable to obtain an oxygen-rich film by setting 1<x<2.0 and 0<y<1.0, whereas when improvement in water vapor barrier properties is important, it is preferable to obtain a nitrogen-rich film by setting 0<x<0.8 and 0.8<y<1.3), and SiOC. Examples of the oxide, the nitride, and the nitride oxide of aluminum may include AlOx, AlNy, and AlOxNy. In terms of inorganic barrier properties, SiOxNy, AlOx, and the mixture thereof may be used as a more preferable material.

The thickness of the inorganic barrier layer is preferably 3 to 500 nm, and more preferably 10 to 100 nm.

The method for forming the inorganic barrier layer is not specifically limited. It is preferable to form the inorganic barrier layer on the film (a) or film (b) which is a substrate film, by a film-forming method such as vapor deposition, sputtering, ion plating, ion beam assist vapor deposition, arc discharge plasma vapor deposition, heat CVD, and plasma CVD. With arc discharge plasma, vaporizing particles having appropriate amount of energy are generated whereby a high density film can be formed. When an inorganic barrier layer containing a plurality of component species is formed, these components may be simultaneously subjected to vapor deposition or sputtering.

In the present invention, the inorganic barrier layer functions as barrier against transmission of a component such as moisture and oxygen from one of the front and back surface of the gas barrier multilayer body to the other surface. In addition thereto, the inorganic barrier layer also protects the substrate film itself and prevents the substrate film from absorbing moisture vapor in the outside air and swelling, whereby effect of preventing the device from deformation is also exhibited.

In addition, when the gas barrier multilayer body of the present invention acts as a substrate and a transparent electrode layer is formed thereon, the inorganic barrier layer prevents outgas emission from the substrate film under the conditions for a transparent electrode layer forming process such as vapor deposition and sputtering. Therefore, the conditions for forming the transparent electrode layer may be freely selected. As a result, there can be obtained an effect that the resistance value of the transparent electrode layer can be reduced, that the transparent electrode layer can be easily manufactured, or the like.

In general, the alicyclic polyolefin resin often has low compatibility with other materials, while the inorganic barrier layer may have high compatibility with both of the alicyclic polyolefin resin and other materials. Thus, by providing the inorganic barrier layer between the layer including the alicyclic polyolefin resin and the layer including other materials, there can also be obtained an effect that favorable adhesiveness between the alicyclic polyolefin resin and the layer including other materials is achieved.

[Metal Alkoxide Layers (a) and (b)]

In the present invention, a metal alkoxide constituting the metal alkoxide layer which the composite layers A and B may have is a compound that has a general structure of R—OM (wherein R is an alkyl group, and M is an arbitrary metal atom) in the molecule.

More specifically, the metal alkoxide may have a structure $(R—O)_m-M-(R^2)_n$ ($R^2$ is an arbitrary organic group, m is a number of 1 or more, and n is a number of 0 or more), i.e., a structure in which one or more groups R—O— and optionally one or more groups $R^2$— bind to a metal atom. Specifically, examples of the group R herein may include a group such as a methyl group and an ethyl group. Specifically, examples of the group $R^2$ may include a group such as an organic group including, e.g., an epoxy group, an amino group, an aryl group, an alkyl group, a fluoro group, a chloro group, a carboxyl group, a carbonate group, an imino group, a thiol group, a nitro group, a vinyl group, a ureido group, a methacryloyl group, and an acryloyl group. When a plurality of groups R are present in one molecule, and when a plurality of groups $R^2$ are present in one molecule, these groups may be the same group or a different group. Particularly, an amino group, an epoxy group, a vinyl group, a methacryloyl group, and an acryloyl group are preferable.

Examples of the metal which the metal alkoxide may contain may include one or more metals selected from Ti, Li, Si, Na, Mg, Ca, St, Ba, Al, Zn, Fe, Cu, and Zr. Particularly, Si, Ti, Al, and Zr are preferable.

The method for forming the metal alkoxide layer is not specifically limited. The metal alkoxide layer may be formed by: a method wherein a surface of a layer acting as a substrate, such as the films (a) or (b) or the inorganic barrier layers (a) or (b), is exposed to steam of the aforementioned metal alkoxide; a method wherein the aforementioned metal alkoxide is dissolved in a solution such as alcohol and the solution is used for coating or spraying on the surface; and the like. Particularly, the method of steam exposure is preferable since a degassing component in the formed metal alkoxide layer is limited.

In the gas barrier multilayer body of the present invention, the thickness of the metal alkoxide layer is preferably 0.005 to 1.0 μm, and more preferably 0.01 to 0.8 μm. When both of the composite layer A and the composite layer B have the metal alkoxide layer, and the surfaces of the metal alkoxide layers are bonded to each other to form the gas barrier multilayer body, the total thickness of these two metal alkoxide layers preferably falls within the aforementioned range. By setting the thickness of the metal alkoxide layer to the aforementioned preferable lower limit or higher, a favorable adhesive force can be exerted. By setting the thickness of the metal alkoxide layer to not more than the aforementioned preferable upper limit, the haze of the gas barrier multilayer body can be maintained at a low level, and the degassing component in the metal alkoxide layer can be reduced.

[Structure of Composite Layers A and B]

With regard to the alicyclic olefin resin film (b) of the composite layer B in the gas barrier multilayer body of the present invention, a surface thereof on a side facing to the composite layer A is a surface that has been subjected to activation treatment, and the activation-treated surface is in contact with the composite layer A directly or via the metal alkoxide layer.

The surface of the activation-treated film (b) has a surface roughness Ra of preferably Ra≤5.0 nm, and more preferably Ra≤3.0 nm. With such a low surface roughness, a better adhesive force can be obtained.

In the present invention, the surface of the composite layer B on a side facing to the composite layer A may be, specifically, (B-i) a surface on which the alicyclic olefin resin film (b) is exposed, or (B-ii) a surface of the metal alkoxide layer (b) which is disposed in contact with the surface of the alicyclic olefin resin film (b).

In the case of the aforementioned embodiment (B-i), the surface of the activation-treated film (b) is the surface of the composite layer B on a side facing to the composite layer A.

In the case of the aforementioned embodiment (B-ii), the surface of the activation-treated film (b) is an interface between the film (b) and the metal alkoxide layer (b). Therefore, the surface of the metal alkoxide layer (b) that is opposite to the interface is the surface of the composite layer B facing to the composite layer A.

FIG. 1 is a cross-sectional view schematically showing an example of a concrete configuration of the composite layer B according to the aforementioned embodiment (B-i). A composite layer B-I shown in FIG. 1 has an alicyclic olefin resin film 13b and an inorganic barrier layer 12b disposed in contact with one surface 3bU of the film 13b. The other surface 3bD of the film 13b is subjected to activation treatment, and is the surface of the composite layer B-I on a side facing to the composite layer A.

Figure 2:
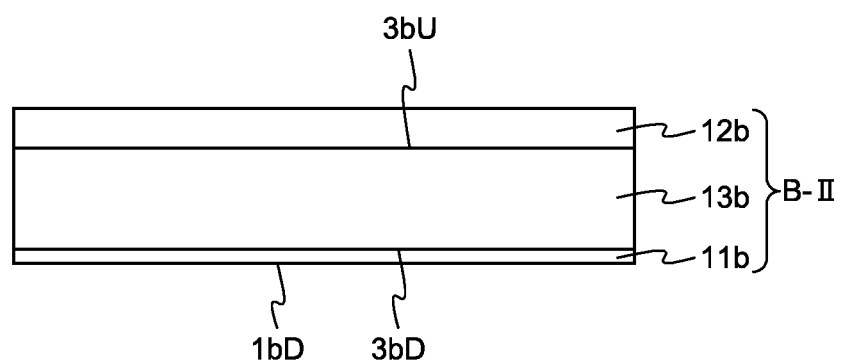
FIG. 2 is a cross-sectional view schematically showing another example of a concrete structure of a composite layer B constituting the gas barrier multilayer body of the present invention.

FIG. 2 is a cross-sectional view schematically showing an example of a concrete structure of the composite layer B according to the aforementioned embodiment (B-ii). The composite layer B-II shown in FIG. 2 has an alicyclic olefin resin film 13b and an inorganic barrier layer 12b disposed in contact with one surface 3bU of the film 13b. The other surface 3bD of the film 13b is subjected to activation treatment, and a metal alkoxide layer 11b is disposed in contact with the surface 3bD. The surface of the composite layer B-II on a side facing to the composite layer A is not the surface 3bD, but the surface 1bD of the metal alkoxide layer.

By having the film (b) being an alicyclic olefin resin film and having the activation-treated surface which is disposed in this manner, favorable gas barrier performance can be maintained over time even under a high temperature and high humidity environment. Furthermore, by bonding the composite layer A and the composite layer B each having the inorganic barrier layer in such a manner, a gas barrier multilayer body having a plurality of inorganic barrier layers can be easily obtained. In addition, in formation of each inorganic barrier layer, lowering in the efficiency of vapor deposition and degradation in quality due to an outgas from the resin layer can be reduced.

As the activation treatment of the surface of the film (b), normal pressure plasma treatment, vacuum plasma treatment, UV ozone treatment, or corona treatment may be employed. Particularly, normal pressure plasma treatment and corona treatment are preferable in terms of shortened treatment time and excellent productivity.

The surface of the composite layer A on a side facing to the composite layer B may be in a variety of structures. In terms of maintaining favorable strength and gas barrier performance under a high temperature and high humidity environment, the surface is preferably:

(A-i) a surface of an exposed inorganic barrier layer (a) that has not been subjected to activation treatment;

(A-ii) a surface of an exposed inorganic barrier layer (a) that has been subjected to activation treatment;

(A-iii) a surface of a metal alkoxide layer (a) disposed in contact with a surface of the inorganic barrier layer (a) having been subjected to activation treatment; or (A-iv) a surface of the metal alkoxide layer (a) disposed in contact with a surface of the film (a) having been subjected to activation treatment.

The surface is more preferably embodiment (A-ii) to (A-iv), and further preferably embodiment (A-iii) to (A-iv).

Figure 3:
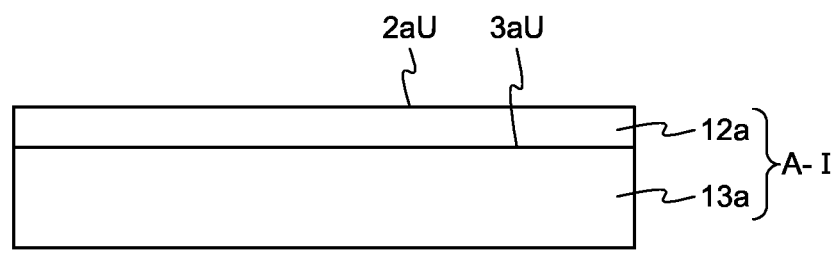
FIG. 3 is a cross-sectional view schematically showing an example of a concrete structure of a composite layer A constituting the gas barrier multilayer body of the present invention.

FIG. 3 is a cross-sectional view schematically showing an example of a concrete structure of the composite layer A according to the aforementioned embodiment (A-i) or (A-ii). A composite layer A-I shown in FIG. 3 has a film 13a and an inorganic barrier layer 12a disposed in contact with one surface 3aU of the film 13a. Furthermore, in the embodiment (A-ii), a surface 2aU of the inorganic barrier layer 12a opposite to the film 13a is subjected to activation treatment. In the embodiments (A-i) and (A-ii), the surface 2aU is a surface of the composite layer A-I on a side facing to the composite layer B.

Figure 4:
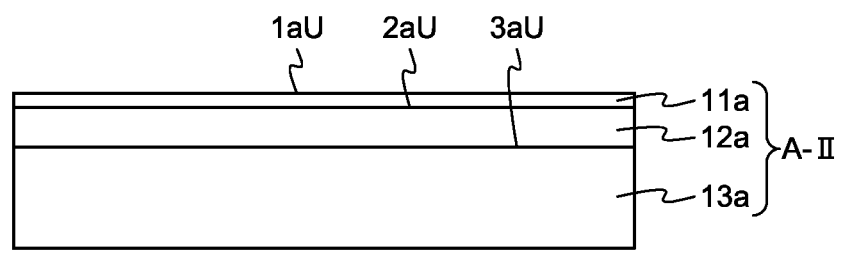
FIG. 4 is a cross-sectional view schematically showing another example of a concrete structure of a composite layer A constituting the gas barrier multilayer body of the present invention.

FIG. 4 is a cross-sectional view schematically showing an example of a concrete structure of the composite layer A according to the aforementioned embodiment (A-iii). A composite layer A-II shown in FIG. 4 has a film 13a and an inorganic barrier layer 12a disposed in contact with one surface 3aU of the film 13a. The surface 2aU of the inorganic barrier layer 12a opposite to the film 13a is subjected to activation treatment. The composite layer A-II further has a metal alkoxide layer 11a disposed in contact with the activation-treated surface. The surface of the composite layer A-II on a side facing to the composite layer B is a surface 1aU of the metal alkoxide layer.

Figure 5:
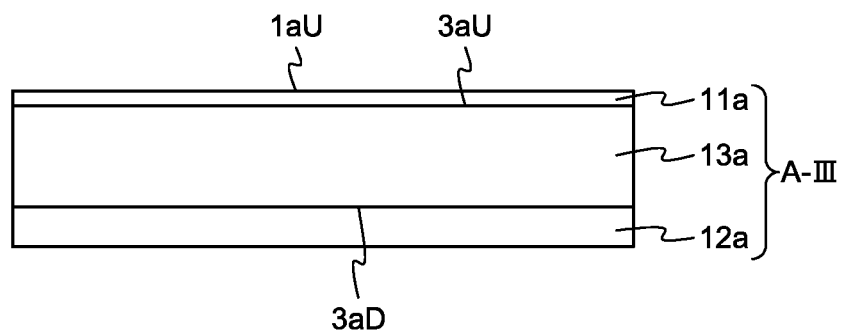
FIG. 5 is a cross-sectional view schematically showing still another example of a concrete structure of a composite layer A constituting the gas barrier multilayer body of the present invention.

FIG. 5 is a cross-sectional view schematically showing an example of a concrete structure of the composite layer A according to the aforementioned embodiment (A-iv). A composite layer A-III shown in FIG. 5 has a film 13a and an inorganic barrier layer 12a disposed in contact with one surface 3aD of the film 13a. The other surface 3aU of the film 13a is subjected to activation treatment. The composite layer A-III further has a metal alkoxide layer 11a disposed in contact with the activation-treated surface. The surface of the composite layer A-III on a side facing to the composite layer B is a surface 1aU of the metal alkoxide layer.

The surface of the composite layer A in an instance wherein the surface on a side facing to the composite layer B does not have the metal alkoxide layer (a) (in the example of FIG. 3, the surface 2aU), or the surface of the composite layer A on which the metal alkoxide layer is formed in an instance wherein the surface on a side facing to the composite layer B has the metal alkoxide layer (a) (in the example of FIG. 4, the surface 2aU; and in the example of FIG. 5, the surface 3aU) has a surface roughness Ra of preferably Ra≤5.0 nm, and more preferably Ra≤3.0 nm. With such a low surface roughness, a better adhesive force can be obtained.

[Gas Barrier Multilayer Body]

In the gas barrier multilayer body of the present invention, the surface of the composite layer A and the surface of the composite layer B are faced to each other and are bonded.

By bonding the composite layers each including an inorganic barrier layer in this manner, there can be obtained a gas barrier multilayer body that has excellent gas barrier performance and high strength, and can be manufactured easily. Specifically, when an inorganic barrier layer is provided on a film by a method such as sputtering, it is difficult to provide a plurality of inorganic barrier layers on one film in terms of manufacturing processes. However, by providing one inorganic barrier layer on each of a plurality of substrate films and bonding them, there can be easily obtained a gas barrier multilayer body having a plurality of inorganic barrier layers. Particularly, if the manufacturing method including a low pressure steps such as sputtering is employed, the number of steps for gas drawing can be reduced, thereby enabling efficient manufacturing. When films each having different properties as a film for each composite layer are used, the properties of the multilayer body can be improved. For example, a film having high heat resistance may be used for the composite layer A, while a film having low moisture permeability may be used for the composite layer B. For example, when forming a conductive film such as ITO on the surface of the multilayer body, the firing temperature is sometimes set high for the purpose of making the resistance value of the ITO as low as possible. In this case, the substrate on which the conductive film is formed is required to have sufficient heat resistance. However, in general, it is technically difficult to obtain one substrate which achieves both sufficient heat resistance and sufficient moisture resistance. Addressing this issue, in the present invention, a film having high heat resistance may be used for the composite layer A while a film having low moisture permeability may be used for the composite layer B, and these composite layers A and B are bonded to each other. Accordingly, there can be obtained a gas barrier multilayer body as one substrate which has a low resistance value and low moisture permeability with relatively simple manufacturing.

Such bonding is preferably performed by thermo-compression bonding. Specifically, it is preferable that the composite layer A and the composite layer B are bonded to each other by compression bonding of the composite layers A and B while the surfaces of the composite layers A and B are in contact with each other, while the inter-layer gap is decompressed and the layers are heated. Operation of such thermo-compression bonding may be performed by using a vacuum laminating apparatus. The conditions for thermo-compression bonding may be appropriately selected from 0.1 to 1.5 MPa and 70 to 250° C. An excessively high pressure may deteriorate the inorganic barrier layer, and an excessively low pressure causes reduction in adhesion strength. Therefore, particularly the condition of 0.3 to 1.0 MPa is more preferable. Since the temperature higher than Tg of the film used in the multilayer body is associated with deformation of the film, Tg-20° C. is preferable. Since an excessively low temperature causes reduction in an adhesive force, 80° C. or higher is preferable. Such thermo-compression bonding may be performed to reduce degradation of gas barrier performance of the gas barrier layer under a high temperature and high humidity environment, compared to a case where another layer such as an adhesive is further provided on the interface for bonding.

It is preferable that the bonding process is performed by roll-to-roll techniques in terms of productivity. However, if necessary for, e.g., adjusting a slow axis, instead of the roll-to-roll bonding, bonding in which each of the composite layers A and B are cut into a desired shape and these layers are sequentially bonded to each other may also be preferably performed.

When the films contained in the composite layers A and B are films having optical anisotropy such as a stretched film and it is required to obtain an optical effect from their phase differences, such an optical effect may be obtained by performing bonding with adjustment of an angle formed between the slow axis of the composite layer A and the slow axis of the composite layer B to a desired angle. Specifically for example, the composite layer A and the composite layer B may be bonded to each other so that the angle formed between the slow axis of the composite layer A and the slow axis of the composite layer B is 57 to 63°, and preferably 58 to 62°.

On the other hand, when the films contained in the composite layers A and B are stretched films, and it is not especially required to obtain optical effects from their phase differences, keeping their stretch directions to be aligned (specifically, within an angle tolerance of (10°) is preferable in order to, e.g., obtain a favorable low thermal expansion coefficient.

Figure 6:
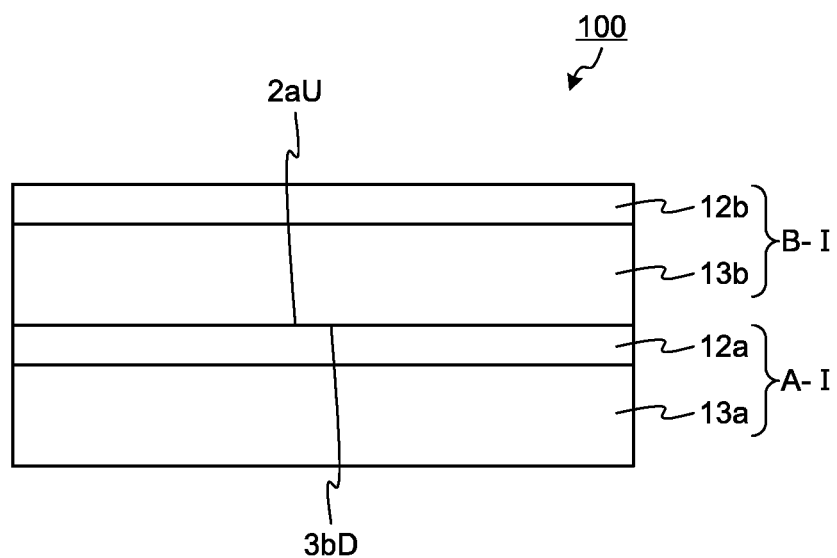
FIG. 6 is a cross-sectional view schematically showing a concrete example of the gas barrier multilayer body of the present invention.

FIG. 6 is a cross-sectional view schematically showing a concrete example of the gas barrier multilayer body of the present invention. In FIG. 6, a gas barrier multilayer body 100 is configured such that the surface 2aU of the composite layer A-I (see FIG. 3) described above as the embodiments (A-i) or (A-ii), and the surface 3bD of the composite layer B-I (see FIG. 1) described above as the embodiment (B-i) are faced and bonded to each other. In the gas barrier multilayer body 100, the activated surface 3bD and the surface 2aU of the inorganic barrier layer 12a are bonded to each other without having another layer interposed therebetween. With such a structure, there can be obtained a gas barrier multilayer body in which gas barrier performance by the alicyclic olefin resin film and the plurality of inorganic barrier layers can be maintained even under a high temperature and high humidity environment.

Figure 7:
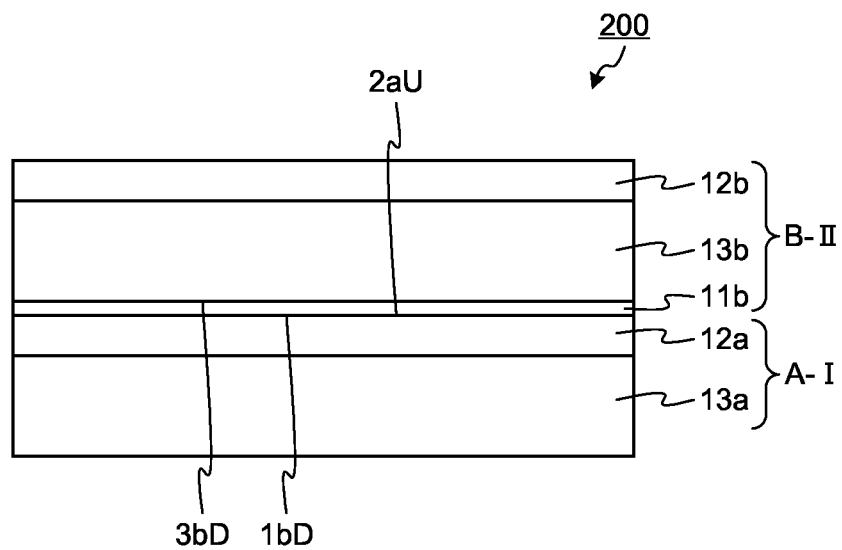
FIG. 7 is a cross-sectional view schematically showing another concrete example of the gas barrier multilayer body of the present invention.

FIG. 7 is a cross-sectional view schematically showing another concrete example of the gas barrier multilayer body of the present invention. In FIG. 7, a gas barrier multilayer body 200 is configured such that the surface 2aU of the composite layer A-I (see FIG. 3) described above as the embodiments (A-i) or (A-ii), and the surface 1bD of the composite layer B-II (see FIG. 2) described above as the embodiment (B-ii) are faced and bonded to each other. In the gas barrier multilayer body 200, the surface 1bD of the metal alkoxide layer 11b disposed in contact with the activation-treated surface 3bD of the alicyclic olefin resin film 13b, and the surface 2aU of the inorganic barrier layer 12a are bonded to each other without having another layer interposed therebetween. With such a structure, there can be obtained a gas barrier multilayer body in which gas barrier performance by the alicyclic olefin resin film and the plurality of inorganic barrier layers can be maintained even under a high temperature and high humidity environment. Furthermore, the adhesive force between the composite layers A and B can be further strengthened.

Figure 8:
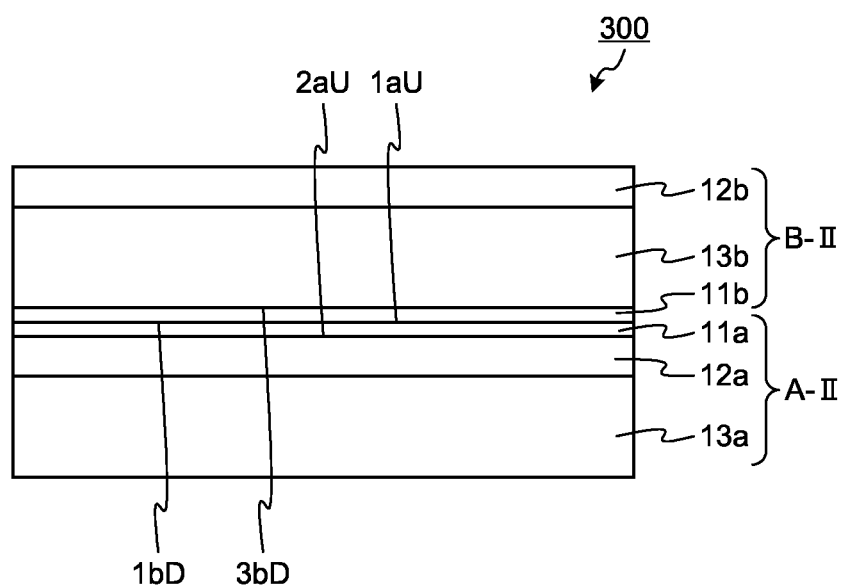
FIG. 8 is a cross-sectional view schematically showing still another concrete example of the gas barrier multilayer body of the present invention.

FIG. 8 is a cross-sectional view schematically showing still another concrete example of the gas barrier multilayer body of the present invention. In FIG. 8, a gas barrier multilayer body 300 is configured such that the surface 1aU of the composite layer A-II (see FIG. 4) described above as the embodiment (A-iii), and the surface 1bD of the composite layer B-II (see FIG. 2) described above as the embodiment (B-ii) are faced and bonded to each other. In the gas barrier multilayer body 300, the surface 1bD of the metal alkoxide layer 11b disposed in contact with the activation-treated surface 3bD of the alicyclic olefin resin film 13b, and the surface 1aU of the metal alkoxide layer 11a disposed in contact with the surface 2aU of the inorganic barrier layers 12a are bonded to each other without having another layer interposed therebetween. With such a structure, there can be obtained a gas barrier multilayer body in which gas barrier performance by the alicyclic olefin resin film and the plurality of inorganic barrier layers can be maintained even under a high temperature and high humidity environment. In addition, the adhesive force between the composite layers A and B can be further strengthened.

Figure 9:
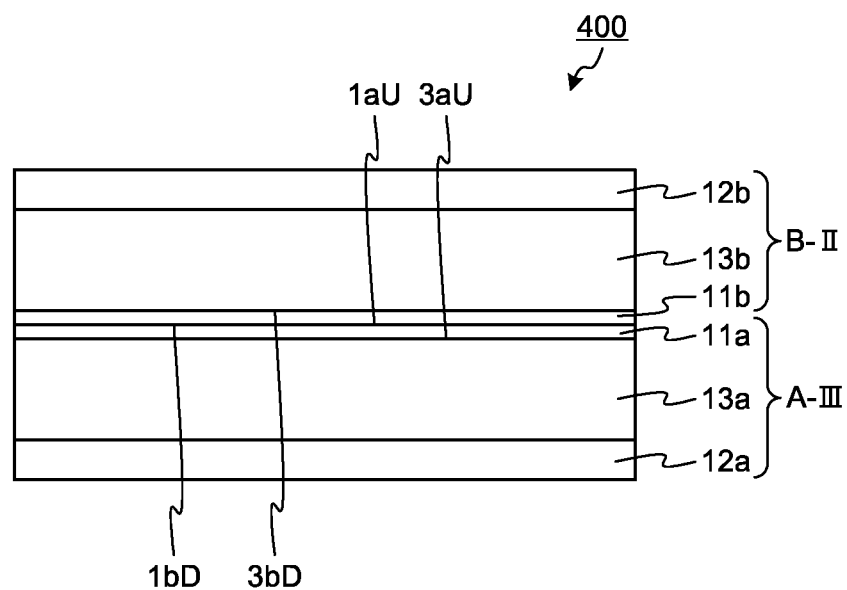
FIG. 9 is a cross-sectional view schematically showing still another concrete example of the gas barrier multilayer body of the present invention.

FIG. 9 is a cross-sectional view schematically showing still another concrete example of the gas barrier multilayer body of the present invention. In FIG. 9, a gas barrier multilayer body 400 is configured such that the surface 1aU of the composite layer A-III (see FIG. 5) described above as the embodiment (A-iv), and the surface 1bD of the composite layer B-II (see FIG. 2) described above as the embodiment (B-ii) are faced and bonded to each other. In the gas barrier multilayer body 400, the surface 1bD of the metal alkoxide layer 11b disposed in contact with the activation-treated surface 3bD of the alicyclic olefin resin film 13b, and the surface 1aU of the metal alkoxide layer 11a disposed in contact with the surface 3aU of the film 13a are bonded to each other without having another layer interposed therebetween. With such a structure, there can be obtained a gas barrier multilayer body in which gas barrier performance by the alicyclic olefin resin film and the plurality of inorganic barrier layers can be maintained even under a high temperature and high humidity environment. In addition, the adhesive force between the composite layers A and B can be further strengthened.

[Other Optional Layers]

The gas barrier multilayer body of the present invention may include an optional layer, in addition to the aforementioned respective layers. As such an optional layer, e.g., an optional film composed of the alicyclic olefin resin and other resin materials, other than the films (a) and (b), may be provided. Besides, an antistatic layer, a hardcoat layer, a conductivity imparting layer, a fouling preventing layer, and a concavo-convex structure layer may be provided. These layers may be combined with each other, and a plurality of them may be provided. The conductivity imparting layer or the like may be obtained by performing patterning by printing or etching. Such an optional layer may be provided by a method such as the method for applying the material of such an optional layer onto the substrate film and curing, or the method for bonding by thermo-compression bonding. In a case where the concavo-convex structure is formed, there may be used the method for disposing an electron beam curable resin between the substrate film and a mold and curing it to form the concavo-convex structure on the film.

Other Embodiments

Although the gas barrier multilayer body of the present invention may include only one of each of the films (a) and (b) and the inorganic barrier layers (a) and (b), the multilayer body may also include another film and another inorganic barrier layer. For example, as a composite layer C, a composite layer according to the same structure as the composite layer A or B may be further provided. Bonding between the composite layer C and the composite layer A or B may be achieved by thermo-compression bonding or the like in a structure in which the interface therebetween is in a structure similar to the interface between the composite layers A and B described above.

There may be a structure in which the surface of the film (b) on a side not facing to the composite layer A has a concavo-convex structure formed by thermal transfer. Since the alicyclic olefin resin film (b) shows superior releasability from a mold, a structure in which such a concavo-convex structure is formed can be easily realized.

[Physical Properties of Gas Barrier Multilayer Body]

The moisture vapor transmission rate of the entire gas barrier multilayer body of the present invention may be $1 \times 10^{-6}$ to $1 \times 10^{-2}$ g/m$^2$·day. The moisture vapor transmission rate of the entire multilayer body may be achieved by appropriately selecting the material and the thickness of the inorganic barrier layer and other layers.

The adhesive force between the composite layer A and the composite layer B of the entire gas barrier multilayer body of the present invention immediately after the completion of the manufacturing may be 1.0 N/cm or higher, and preferably 2.0 N/cm or higher. It is preferable that the difference between the adhesive force immediately after the completion of manufacturing and the adhesive force after the multilayer body was exposed to high temperature and high humidity is 10% or lower.

The haze of the entire gas barrier multilayer body of the present invention is not specifically limited. When the multilayer body is used for an optical use where light diffusion is not particularly intended, it is generally preferable that the haze is low. The haze may be preferably 3.0% or lower, and more preferably 1.0% or lower.

[Applications]

Applications of the gas barrier multilayer body of the present invention are not especially limited. The multilayer body may be used as a component of a device such as a liquid crystal display device, a display device which have an organic EL element, a light source device, and a solar cell. Specifically, the multilayer body according to the present invention may be used as a layer for sealing other components constituting the device so as to protect them from moisture and oxygen.

As an especially preferable application, the gas barrier multilayer body of the present invention having a certain optical anisotropy may combine with a polarizer to obtain a circularly polarizing plate, to be used as a component of a display device.

[Circularly Polarizing Plate]

The circularly polarizing plate of the present invention has the gas barrier multilayer body of the present invention, and a polarizer.

In the circularly polarizing plate of the present invention, preferably, one of the films (a) and (b) of the gas barrier multilayer body is a quarter wave plate, and the other is a half wave plate. An intersection angle between the slow axes of these quarter wave plate and half wave plate is preferably 57 to 63°, and more preferably 58 to 62°.

The polarizer may be disposed on the surface of the gas barrier multilayer body on a side of the half wave plate. Lamination is performed so that the angle of the slow axis of the half wave plate is preferably 13 to 17°, and more preferably 14 to 16° with respect to the transmission axis of the polarizer.

As a polarizer which the circularly polarizing plate of the present invention may have, an iodine-based polarizing film, a dye-based polarizing film, or a wire grid polarizing film are used.

The circularly polarizing plate of the present invention may be configured by, on one surface of the gas barrier multilayer body of the present invention, forming the polarizer or bonding another multilayer body having the polarizer.

Applications of the circularly polarizing plate of the present invention are not especially limited, and the circularly polarizing plate may be used as a circularly polarizing plate of a variety of display devices such as a liquid crystal display device.

EXAMPLES

The present invention will be described in more detail with reference to the examples and the comparative examples. However, the present invention is not limited to the following examples. In the examples and the comparative examples, measurements of various physical properties were conducted as follows.

(Measurement of Thickness)

Measurement of the thickness of a film and the like was conducted at 10 points in the TD direction by using a contact film thickness meter, and a mean value thereof was calculated.

(Measurement of Thickness of Metal Alkoxide Layer)

A sample of a composite layer having a metal alkoxide layer or the like was processed in a micro sampling device of a focused ion beam processing observation instrument FB-2100 (manufactured by Hitachi, Ltd.) to prepare a cut piece for observation. The prepared cut piece was observed and measured at 20 points randomly using a transmission electron microscope H-7500 (manufactured by Hitachi, Ltd.), and the thickness of the metal alkoxide layer was calculated as the mean of the measured values.

(Surface Roughness)

In accordance with the prescription of JIS B 0601:2001, measurement was conducted using a color 3D laser microscope (manufactured by Keyence Corporation, product name "VK-9500"), and a surface roughness Ra was calculated.

(Haze)

Measurement was conducted using a turbidimeter (manufactured by Nippon Denshoku Industries Co., Ltd, product name "NDM 2000").

(Measurement of Adhesive Force)

A gas barrier multilayer body was cut out into a size of 10 mm in width. The cut out multilayer body was fixed to glass with an adhesive, and was measured under the conditions of a tensile angle of 90° and a peel rate of 20 mm/min using an autography manufactured by Shimazu Corporation. Measurement was conducted immediately after the manufacture of the subject to be measured was completed, and after the subject to be measured was thereafter exposed to a high temperature and high humidity environment.

(Observation of Peeled Surface)

A cross section of the peeled surface after a peeling test was observed using an FE-TEM for identifying the peeled interface.

(Moisture Permeability)

Based on JIS K7129B, using "PERMATRAN W3/33" (manufactured by MOCON, Inc.), measurement was conducted under the conditions of 40° C. and 90% RH. Measurement was conducted immediately after the manufacture of the subject to be measured was completed, and after the subject to be measured was thereafter exposed to a high temperature and high humidity environment.

(Exposure to High Temperature and High Humidity Environment)

Exposure to a high temperature and high humidity environment was conducted using "EHS-211MD" (manufactured by ESPEC Corp.), by holding the sample at 80° C. and 90% RH for one hour, followed by holding the sample at 120° C. and 30% RH for one hour.

(Measurement of Retardation)

With KOBRA-21ADH manufactured by Oji Scientific Instruments, measurement was conducted at 10 points in the TD direction.

Example 1

A gas barrier multilayer body 1 having a layer structure schematically illustrated in FIG. 8 was prepared.

(1-1. Preparation of Raw Film 1)

Pellets of a norbornene polymer 1 (manufactured by ZEON CORPORATION, trade name "ZEONOR1600", Tg 163° C., refractive index 1.525) were dried at 70° C. for two hours using a hot air dryer in which air is circulated, and then were supplied to a T-die film melt extrusion molding machine having a resin melting kneader equipped with a screw having a diameter of 65 mm, for performing extrusion molding under the conditions of a melting resin temperature of 240° C. and a T-die width of 500 mm. As a result, a raw film 1 having a thickness of 100 μm was obtained. As the T-die, a T-die having a polished mirror surface was used.

(1-2. Preparation of Stretched Film 1)

The obtained raw film 1 was stretched by 2.0 times in the film flow direction (the MD direction) at a stretching temperature of 172° C. using a lengthwise stretching machine, and then supplied to a transverse stretching machine employing a tenter method, to be stretched by 2.0 times in the film width direction (the TD direction) at a temperature of 172° C. The stretched film was wound up to obtain a stretched film 1.

(1-3. Formation of Inorganic Barrier Layer)

Using a film-winding magnetron sputtering system, a SiOx layer having a thickness of 100 nm was formed as an inorganic barrier layer on the surface of the obtained stretched film 1 by using a Si target under the conditions of an argon flow rate of 150 sccm, an oxygen flow rate of 10 sccm, an output of 4.0 kW, a vacuum degree of 0.3 Pa, a winding speed of 0.5 m/min, and a tension of 30N. As a result, a multilayer body P1 having a layer structure of (SiOx layer)–(stretched film) was obtained. The values of surface roughness Ra of the surfaces on the SiOx layer side and on the stretched film side of the multilayer body P1 were measured, and found out to be 0.65 nm and 0.70 nm, respectively. The obtained multilayer body P1 was cut out to obtain two pieces each having a size of 200 mm×200 mm as a multilayer body P1-A and a multilayer body P1-B, respectively.

(1-4. Preparation of Composite Layer A1)

Surface treatment was carried out on the surface of the multilayer body P1-A on the SiOx layer side using a remote-type normal pressure plasma apparatus under the conditions of a nitrogen flow rate of 200 L/min, a dry air flow rate of 200 mL/min, an output of 1.5 kW, 1.0 m/min, and a treatment width of 300 mm.

The surface-treated multilayer body P1-A was placed in an airtight vessel, and the surface on the surface-treated SiOx layer side was exposed to the steam of γ-aminopropyl trimethoxysilane (KBM-903: manufactured by Shin-Etsu Silicone) for 10 minutes to form a metal alkoxide layer. As a result, a composite layer A1 (corresponding to the composite layer A-II in FIG. 8) having a layer structure of (metal alkoxide layer)-(SiOx layer)-(stretched film) was obtained.

(1-5. Preparation of Composite Layer B1)

Surface treatment was carried out on the surface of the multilayer body P1-B on the stretched film side using a remote-type normal pressure plasma apparatus under the conditions of a nitrogen flow rate of 200 L/min, a dry air flow rate of 200 mL/min, an output of 1.5 kW, 1.0 m/min, and a treatment width of 300 mm.

The surface-treated multilayer body P1-B was placed in an airtight vessel, and the surface on the surface-treated stretched film side was exposed to the steam of γ-glycidoxypropyltrimethoxysilane (KBM-403: manufactured by Shin-Etsu Silicone) for 10 minutes to form a metal alkoxide layer. As a result, a composite layer B1 (corresponding to the composite layer B-II in FIG. 8) having a layer structure of (SiOx layer)-(stretched film)-(metal alkoxide layer) was obtained.

(1-6. Preparation of Gas Barrier Multilayer Body 1)

The surfaces on the metal alkoxide layer sides of the composite layer A1 and the composite layer B1 were faced to each other, and these layers were stacked. These layers were then bonded by compression bonding using a vacuum laminating apparatus under the conditions of 0.9 MPa, 130° C., and 360 seconds. As a result, a gas barrier multilayer body 1 having a layer structure of (SiOx layer)-(stretched film)-(metal alkoxide layer)-(metal alkoxide layer)-(SiOx layer)-(stretched film) was obtained.

(1-7. Evaluation)

The total film thickness of the two metal alkoxide layers of the gas barrier multilayer body 1 was 0.05 μm. The haze of the gas barrier multilayer body 1 was 0.20%. The adhesive force between the composite layers A1 and B1 of the gas barrier multilayer body 1 and the moisture permeability of the gas barrier multilayer body 1 were measured, and found out to be 4.50 N/cm and $0.20 \times 10^{-2}$ g/m$^2$/day, respectively. The peeled interface was the interface between the metal alkoxide layer and the multilayer body P1-B. The adhesive force and moisture permeability after exposure to a high temperature and high humidity environment were measured, and found out to be 4.40 N/cm and $0.21 \times 10^{-2}$ g/m$^2$/day, respectively. The peeled interface was the interface between the metal alkoxide layer and the multilayer body P1-B.

Example 2

A gas barrier multilayer body 2 having a layer structure schematically illustrated in FIG. 9 was prepared.

(2-1. Preparation of Composite Layer A2)

Surface treatment and formation of metal alkoxide were performed in the same manner as the step (1-4) of Example 1, except that the surface treatment and the formation of a metal alkoxide layer were performed on the surface of the multilayer body P1-A on the stretched film side instead of the surface on the SiOx layer side. As a result, a composite layer A2 (corresponding to the composite layer A-III in FIG. 9) having a layer structure of (metal alkoxide layer)-(stretched film)-(SiOx layer) was obtained.

(2-2. Preparation of gas barrier multilayer body 2)

The composite layers A2 and B1 were bonded by compression bonding in the same manner as the step (1-6) of Example 1, except that the composite layer A2 obtained in the aforementioned (2-1) was used in place of the composite layer A1. As a result, a gas barrier multilayer body 2 having a layer structure of (SiOx layer)-(stretched film)-(metal alkoxide layer)-(metal alkoxide layer)-(stretched film)-(SiOx layer) was obtained.

(2-3. Evaluation)

The total film thickness of the two metal alkoxide layers of the gas barrier multilayer body 2 was 0.05 μm. The haze of the gas barrier multilayer body 2 was 0.21%. The adhesive force between the composite layers A2 and B1 of the gas barrier multilayer body 2 and the moisture permeability of the gas barrier multilayer body 2 were measured, and found out to be 3.10 N/cm and $0.20 \times 10^{-2}$ g/m$^2$/day, respectively. The peeled interface was the interface between the metal alkoxide layer and the multilayer body P1-B. The adhesive force and moisture permeability after exposure to a high temperature and high humidity environment were measured, and found out to be 3.00 N/cm and $0.22 \times 10^{-2}$ g/m$^2$/day, respectively. The peeled interface was the interface between the metal alkoxide layer and the multilayer body P1-B.

Example 3

A gas barrier multilayer body 3 having a layer structure schematically illustrated in FIG. 6 was prepared.

(3-1. Preparation of Composite Layer A3 and Composite Layer B3)

Surface treatment of the multilayer body P1-A was performed in the same manner as the step (1-4) of Example 1, except that formation of a metal alkoxide layer was not performed. As a result, a composite layer A3 (corresponding to the composite layer A-I in FIG. 6) having a layer structure of (SiOx layer)-(stretched film) and including the plasma-treated surface on the SiOx layer side was obtained.

On the other hand, surface treatment of the multilayer body P1-B was performed in the same manner as the step (1-5) of Example 1, except that formation of a metal alkoxide layer was not performed. As a result, a composite layer B3 (corresponding to the composite layer B-I in FIG. 6) having a layer structure of (SiOx layer)-(stretched film) and including the plasma-treated surface on the stretched film side was obtained.

(3-2. Preparation of Gas Barrier Multilayer Body 3)

The plasma-treated surfaces of the composite layer A3 and the composite layer B3 were faced to each other, and these layers were stacked. These layers were then bonded by compression bonding using a vacuum laminating apparatus under the conditions of 0.9 MPa, 130° C., and 360 seconds. As a result, a gas barrier multilayer body 3 having a layer structure of (SiOx layer)-(stretched film)-(SiOx layer)-(stretched film) was obtained.

(3-3. Evaluation)

The haze of the gas barrier multilayer body 3 was 0.20%. The adhesive force between the composite layers A3 and B3 of the gas barrier multilayer body 3 and the moisture permeability of the gas barrier multilayer body 3 were measured, and found out to be 2.20 N/cm and $0.20 \times 10^{-2}$ g/m²/day, respectively. The peeled interface was the interface between the multilayer body P1-A and the multilayer body P1-B. The adhesive force and moisture permeability after exposure to a high temperature and high humidity environment were measured, and found out to be 0.60 N/cm and $0.80 \times 10^{-2}$ g/m²/day, respectively. The peeled interface was the interface between the multilayer body P1-A and the multilayer body P1-B.

Example 4

A gas barrier multilayer body 4 having a layer structure schematically illustrated in FIG. 6 was prepared. The gas barrier multilayer body 4 has the same structure as that of the gas barrier multilayer body 3 of Example 3, except that there is a difference in an mode of surface treatment.

(4-1. Preparation of Composite Layer A4 and Composite Layer B4)

Corona treatment (0.15 kW, gap between electrodes 2 mm, treatment speed 1.0 m/min, and a treatment width 300 mm) was performed on the surface on the SiOx layer side of the multilayer body P1-A obtained in the step (1-3) of Example 1. As a result, a composite layer A4 (corresponding to the composite layer A-I in FIG. 6) having a layer structure of (SiOx layer)-(stretched film) and including the corona-treated surface on the SiOx layer side was obtained.

On the other hand, corona treatment (0.15 kW, gap between electrodes 2 mm, treatment speed 1.0 m/min, and a treatment width 300 mm) was performed on the surface on the stretched film side of the multilayer body P1-B obtained in the step (1-3) of Example 1. As a result, a composite layer B4 (corresponding to the composite layer B-I in FIG. 6) having a layer structure of (SiOx layer)-(stretched film) and including the corona-treated surface on the stretched film side was obtained.

(4-2. Preparation of Gas Barrier Multilayer Body 4)

The corona treated surfaces of the composite layer A4 and the composite layer B4 were faced to each other, and these layers were stacked. These layers were then bonded by compression bonding using a vacuum laminating apparatus under the conditions of 0.9 MPa, 130° C., and 360 seconds. As a result, a gas barrier multilayer body 4 having a layer structure of (SiOx layer)-(stretched film)-(SiOx layer)-(stretched film) was obtained.

(4-3. Evaluation)

The haze of the gas barrier multilayer body 4 was 0.20%. The adhesive force between the composite layers A4 and B4 of the gas barrier multilayer body 4 and the moisture permeability of the gas barrier multilayer body 4 were measured, and found out to be 2.00 N/cm and $0.20 \times 10^{-2}$ g/m²/day, respectively. The peeled interface was the interface between the multilayer body P1-A and the multilayer body P1-B.

The adhesive force and moisture permeability after exposure to a high temperature and high humidity environment were measured, and found out to be 0.55 N/cm and $1.00 \times 10^{-2}$ g/m²/day, respectively. The peeled interface was the interface between the multilayer body P1-A and the multilayer body P1-B.

Example 5

A gas barrier multilayer body 5 having a layer structure schematically illustrated in FIG. 8 was prepared. The gas barrier multilayer body 5 has the same structure as that of the gas barrier multilayer body 1 of Example 1, except that there is a difference in the surface roughness of the layer constituting the multilayer body.

(5-1. Preparation of Raw Film 5)

The raw film 1 obtained in the step (1-1) of Example 1 was further pressed between a metal mirror surface roll (having a surface that was subjected to hard chromium plating of 100 μm in thickness) heated to 165° C. and a ceramic roll (surface roughness Ra 6.0 nm) heated to 180° C. with a linear pressure of 100 kN/m. As a result, a raw film 5 having a thickness of 95 μm was obtained.

(5-2. Formation of Inorganic Barrier Layer)

An inorganic barrier layer was formed in the same manner as the step (1-3) of Example 1, except that the raw film 5 obtained in the aforementioned (5-1) was used in place of the stretched film 1. As a result, a multilayer body P5 having a layer structure of (SiOx layer)-(stretched film) was obtained. The values of surface roughness Ra of the surfaces on the SiOx layer side and on the stretched film side of the multilayer body P5 were measured, and found out to be 5.5 nm and 5.9 nm, respectively. The obtained multilayer body P5 was cut out to obtain two pieces each having a size of 200 mm×200 mm as a multilayer body P5-A and a multilayer body P5-B, respectively.

(5-3. Preparation of Composite Layer A5 and Composite Layer B5)

Surface treatment and formation of metal alkoxide were performed in the same manner as the steps (1-4) and (1-5) of Example 1, except that the P5-A and the P5-B obtained in the aforementioned (5-2) were used in place of the multilayer bodies P1-A and P1-B. As a result, a composite layer A5 (corresponding to the composite layer A-II in FIG. 8) having a layer structure of (metal alkoxide layer)-(SiOx layer)-(stretched film), and a composite layer B5 (corresponding to the composite layer B-II in FIG. 8) having a layer structure of (SiOx layer)-(stretched film)-(metal alkoxide layer) were obtained.

(5-4. Preparation of Gas Barrier Multilayer Body 5)

The composite layers A5 and B5 were bonded by compression bonding in the same manner as the step (1-6) of Example 1, except that the composite layers A5 and B5 obtained in the aforementioned (5-3) were used in place of the composite layers A1 and B1. As a result, a gas barrier multilayer body 5 having a layer structure of (SiOx layer)-(stretched film)-(metal alkoxide layer)-(metal alkoxide layer)-(SiOx layer)-(stretched film) was obtained.

(5-5. Evaluation)

The total film thickness of the two metal alkoxide layers of the gas barrier multilayer body 5 was 0.05 µm. The haze of the gas barrier multilayer body 5 was 0.35%. The adhesive force between the composite layers A5 and B5 of the gas barrier multilayer body 5 and the moisture permeability of the gas barrier multilayer body 5 were measured, and found out to be 1.50 N/cm and $0.22 \times 10^{-2}$ g/m²/day, respectively. The peeled interface was the interface between the metal alkoxide layer and the multilayer body P5-B. The adhesive force and moisture permeability after exposure to a high temperature and high humidity environment were measured, and found out to be 1.20 N/cm and $0.23 \times 10^{-2}$ g/m²/day, respectively. The peeled interface was the interface between the metal alkoxide layer and the multilayer body P5-B.

Example 6

A gas barrier multilayer body 6 having a layer structure schematically illustrated in FIG. 6 was prepared. The gas barrier multilayer body 6 has the same structure as that of the gas barrier multilayer body 3 of Example 3, except that there is a difference in the surface roughness of the layer constituting the multilayer body.

(6-1. Preparation of Composite Layer A6 and Composite Layer B6)

Surface treatment of the multilayer body P5-A was performed in the same manner as the step (1-4) of Example 1, except that the multilayer body P5-A obtained in the step (5-2) of Example 5 was used in place of the multilayer body P1-A and that formation of a metal alkoxide layer was not performed. As a result, a composite layer A6 (corresponding to the composite layer A-I in FIG. 6) having a layer structure of (SiOx layer)–(stretched film) and including the plasma-treated surface on the SiOx layer side was obtained.

On the other hand, surface treatment of the multilayer body P5-B was performed in the same manner as the step (1-5) of Example 1, except that the multilayer body P5-B obtained in the step (5-2) of Example 5 was used in place of the multilayer body P1-B and that formation of a metal alkoxide layer was not performed. As a result, a composite layer B6 (corresponding to the composite layer B-I in FIG. 6) having a layer structure of (SiOx layer)–(stretched film) and including the plasma-treated surface on the stretched film side was obtained.

(6-2. Preparation of Gas Barrier Multilayer Body 6)

The plasma-treated surfaces of the composite layer A6 and the composite layer B6 were faced to each other, and these layers were stacked. These layers were then bonded by compression bonding using a vacuum laminating apparatus under the conditions of 0.9 MPa, 130° C., and 360 seconds. As a result, a gas barrier multilayer body 6 having a layer structure of (SiOx layer)–(stretched film)–(SiOx layer)–(stretched film) was obtained.

(6-3. Evaluation)

The haze of the gas barrier multilayer body 6 was 0.35%. The adhesive force between the composite layers A6 and B6 of the gas barrier multilayer body 6 and the moisture permeability of the gas barrier multilayer body 6 were measured, and found out to be 1.40 N/cm and $0.21 \times 10^{-2}$ g/m²/day, respectively. The peeled interface was the interface between the multilayer body P5-A and the multilayer body P5-B. The adhesive force and moisture permeability after exposure to a high temperature and high humidity environment were measured, and found out to be 0.53 N/cm and $1.00 \times 10^{-2}$ g/m²/day, respectively. The peeled interface was the interface between the multilayer body P5-A and the multilayer body P5-B.

Example 7

A gas barrier multilayer body 7 having a layer structure schematically illustrated in FIG. 8 was prepared. The gas barrier multilayer body 7 has the same structure as that of the gas barrier multilayer body 1 of Example 1, except that there is a difference in the conditions for formation of a metal alkoxide layer.

(7-1. Preparation of Composite Layers A7 and B7)

Surface treatment and formation of metal alkoxide were performed in the same manner as the steps (1-4) and (1-5) of Example 1, except that the exposure treatment time was set to 2 minutes during the formation of the metal alkoxide layer. As a result, a composite layer A7 (corresponding to the composite layer A-II in FIG. 8) and a composite layer B7 (corresponding to the composite layer B-II in FIG. 8) were obtained.

(7-2. Preparation of Gas Barrier Multilayer Body 7)

The composite layers A7 and B7 were bonded by compression bonding in the same manner as the step (1-6) of Example 1, except that the composite layers A7 and B7 obtained in the aforementioned (7-1) were used in place of the composite layers A1 and B1. As a result, a gas barrier multilayer body 7 having a layer structure of (SiOx layer)-(stretched film)-(metal alkoxide layer)-(metal alkoxide layer)-(SiOx layer)-(stretched film) was obtained.

(7-3. Evaluation)

The total thickness of the two metal alkoxide layers of the gas barrier multilayer body 7 was 0.005 µm. The haze of the gas barrier multilayer body 7 was 0.20%. The adhesive force between the composite layers A7 and B7 of the gas barrier multilayer body 7 and the moisture permeability of the gas barrier multilayer body 7 were measured, and found out to be 2.20 N/cm and $0.22 \times 10^{-2}$ g/m²/day, respectively. The peeled interface was the interface between the metal alkoxide layer and the multilayer body P1-B. The adhesive force and moisture permeability after exposure to a high temperature and high humidity environment were measured, and found out to be 0.52 N/cm and $0.50 \times 10^{-2}$ g/m²/day, respectively. The peeled interface was the interface between the metal alkoxide layer and the multilayer body P1-B.

Example 8

A gas barrier multilayer body 8 having a layer structure schematically illustrated in FIG. 9 was prepared. The gas barrier multilayer body 8 has the same structure as that of the gas barrier multilayer body 2 of Example 2, except that there is a difference in the method for forming a metal alkoxide layer.

(8-1. Preparation of composite layer A8)

Surface treatment was carried out on the surface on the stretched film side of the multilayer body P1-A obtained in the step (1-3) of Example 1 using a remote-type normal pressure plasma apparatus under the conditions of a nitrogen flow rate of 200 L/min, a dry air flow rate of 200 mL/min, an output of 1.5 kW, 1.0 m/min, and a treatment width of 300 mm.

To the surface-treated surface, a mixed solution consisting of 1.0 part by weight of γ-aminopropyl trimethoxysilane (KBM-903: manufactured by Shin-Etsu Silicone), 79.2 parts by weight of ethanol, and 19.8 parts by weight of pure water was applied using a bar coater #6, and subjected to annealing treatment at 85° C. for 30 minutes, to form a metal alkoxy layer. As a result, a composite layer A8 (corresponding to the composite layer A-III in FIG. 9) having a layer structure of (metal alkoxide layer)-(stretched film)-(SiOx layer) was obtained.

(8-2. Preparation of Composite Layer B8)

Surface treatment was carried out on the surface on the stretched film side of the multilayer body P1-B obtained in the step (1-3) of Example 1 using a remote-type normal pressure plasma apparatus under the conditions of a nitrogen flow rate of 200 L/min, a dry air flow rate of 200 mL/min, an output of 1.5 kW, 1.0 m/min, and a treatment width of 300 mm.

To the surface-treated surface, a mixed solution consisting of 1.0 part by weight of γ-glycidoxypropyltrimethoxysilane (KBM-403: manufactured by Shin-Etsu Silicone), 79.2 parts by weight of ethanol, and 19.8 parts by weight of pure water was applied using a bar coater #6, and subjected to annealing treatment at 85° C. for 30 minutes, to form a metal alkoxy layer. As a result, a composite layer B8 (corresponding to the composite layer B-II in FIG. 9) having a layer structure of (SiOx layer)-(stretched film)-(metal alkoxide layer) was obtained.

(8-3. Preparation of Gas Barrier Multilayer Body 8)

The composite layers A8 and B8 were bonded by compression bonding in the same manner as the step (1-6) of Example 1, except that the composite layers A8 and B8 obtained in the aforementioned (8-1) and (8-2) were used in place of the composite layers A1 and B1. As a result, a gas barrier multilayer body 8 having a layer structure of (SiOx layer)-(stretched film)-(metal alkoxide layer)-(metal alkoxide layer)-(stretched film)-(SiOx layer) was obtained.

(8-4. Evaluation)

The total thickness of the two metal alkoxide layers of the gas barrier multilayer body 8 was 1.3 µm. The haze of the gas barrier multilayer body 8 was 2.10%. The adhesive force between the composite layers A8 and B8 of the gas barrier multilayer body 8 and the moisture permeability of the gas barrier multilayer body 8 were measured, and found out to be 3.50 N/cm and $0.23 \times 10^{-2}$ g/m²/day, respectively. The peeled interface was the interface between the metal alkoxide layer and the multilayer body P1-B. The adhesive force and moisture permeability after exposure to a high temperature and high humidity environment were measured, and found out to be 3.40 N/cm and $0.24 \times 10^{-2}$ g/m²/day, respectively. The peeled interface was the interface between the metal alkoxide layer and the multilayer body P1-B.

Example 9

A gas barrier multilayer body 9 having a layer structure schematically illustrated in FIG. 8 was prepared. The gas barrier multilayer body 9 has the same structure as that of the gas barrier multilayer body 5 of Example 5, except that there is a difference in the method for forming a metal alkoxide layer.

(9-1. Preparation of Composite Layer A9)

Surface treatment was carried out on the surface on the SiOx layer side of the multilayer body P5-A obtained in the step (5-2) of Example 5 using a remote-type normal pressure plasma apparatus under the conditions of a nitrogen flow rate of 200 L/min, a dry air flow rate of 200 mL/min, an output of 1.5 kW, 1.0 m/min, and a treatment width of 300 mm.

To the surface-treated surface, a mixed solution consisting of 1.0 part by weight of γ-aminopropyl trimethoxysilane (KBM-903: manufactured by Shin-Etsu Silicone), 79.2 parts by weight of ethanol, and 19.8 parts by weight of pure water was applied using a bar coater #6, and subjected to annealing treatment at 85° C. for 30 minutes, to form a metal alkoxy layer. As a result, a composite layer A9 (corresponding to the composite layer A-II in FIG. 8) having a layer structure of (metal alkoxide layer)-(SiOx layer)-(stretched film) was obtained.

(9-2. Preparation of Composite Layer B9)

Surface treatment was carried out on the surface on the stretched film side of the multilayer body P5-B obtained in the step (5-2) of Example 5 using a remote-type normal pressure plasma apparatus under the conditions of a nitrogen flow rate of 200 L/min, a dry air flow rate of 200 mL/min, an output of 1.5 kW, 1.0 m/min, and a treatment width of 300 mm.

To the surface-treated surface, a mixed solution consisting of 1.0 part by weight of γ-glycidoxypropyltrimethoxysilane (KBM-403: manufactured by Shin-Etsu Silicone), 79.2 parts by weight of ethanol, and 19.8 parts by weight of pure water was applied using a bar coater #6, and subjected to annealing treatment at 85° C. for 30 minutes, to form a metal alkoxy layer. As a result, a composite layer B9 (corresponding to the composite layer B-II in FIG. 8) having a layer structure of (SiOx layer)-(stretched film)-(metal alkoxide layer) was obtained.

(9-3. Preparation of Gas Barrier Multilayer Body 9)

The composite layers A9 and B9 were bonded by compression bonding in the same manner as the step (1-6) of Example 1, except that the composite layers A9 and B9 obtained in the aforementioned (9-1) and (9-2) were used in place of the composite layers A1 and B1. As a result, a gas barrier multilayer body 9 having a layer structure of (SiOx layer)-(stretched film)-(metal alkoxide layer)-(metal alkoxide layer)-(SiOx layer)-(stretched film) was obtained.

(9-4. Evaluation)

The total thickness of the two metal alkoxide layers of the gas barrier multilayer body 9 was 1.7 µm. The haze of the gas barrier multilayer body 9 was 2.30%. The adhesive force between the composite layers A9 and B9 of the gas barrier multilayer body 9 and the moisture permeability of the gas barrier multilayer body 9 were measured, and found out to be 1.50 N/cm and $0.24 \times 10^{-2}$ g/m²/day, respectively. The peeled interface was the interface between the metal alkoxide layer and the multilayer body P5-B. The adhesive force and moisture permeability after exposure to a high temperature and high humidity environment were measured, and found out to be 1.50 N/cm and $0.30 \times 10^{-2}$ g/m²/day, respectively. The peeled interface was the interface between the metal alkoxide layer and the multilayer body P5-B.

Example 10

A gas barrier multilayer body 10 having a layer structure schematically illustrated in FIG. 7 was prepared.

(10-1. Preparation of Gas Barrier Multilayer Body)

The multilayer body P1-A obtained in the step (1-3) of Example 1 was used as it was without performing surface treatment and formation of a metal alkoxide layer. The surface on the SiOx layer side of the multilayer body P1-A and the surface on the metal alkoxide layer side of the composite layer B1 obtained in the step (1-5) of Example 1 were faced to each other, and these layers were stacked. These layers were then bonded by compression bonding using a vacuum laminating apparatus under the conditions of 0.9 MPa, 130° C., and 360 seconds. As a result, a gas barrier multilayer body 10 having a layer structure of (SiOx layer)-(stretched film)-(metal alkoxide layer)-(SiOx layer)-(stretched film) was obtained.

(10-2. Evaluation)

The thickness of the metal alkoxide of the gas barrier multilayer body 10 was 0.03 μm. The haze of the gas barrier multilayer body 10 was 0.20%. The adhesive force between the multilayer bodies P1-A and B1 of the gas barrier multilayer body 10 and the moisture permeability of the gas barrier multilayer body 10 were measured, and found out to be 3.50 N/cm and $0.20 \times 10^{-2}$ g/m$^2$/day, respectively. The peeled interface was the interface between the P1-A and the metal alkoxide layer. The adhesive force and moisture permeability after exposure to a high temperature and high humidity environment were measured, and found out to be 3.00 N/cm and $0.24 \times 10^{-2}$ g/m$^2$/day, respectively. The peeled interface was the interface between the P1-A and the metal alkoxide layer.

Example 11

A gas barrier multilayer body 11 having a layer structure schematically illustrated in FIG. 8 was prepared. The gas barrier multilayer body 11 has the same structure as that of the gas barrier multilayer body 1 of Example 1, except that a non-stretched film made of a different material was used in place of the stretched film.

(11-1. Synthesis of norbornene Polymer 2)

In a glass reactor that had been subjected to nitrogen purging, 0.77 parts by weight of (allyl)palladium(tricyclohexylphosphine) chloride and 1.14 parts by weight of lithium tetrakis(pentafluorophenyl)borate were placed, and subsequently 2 parts by weight of toluene was added, to prepare a catalyst solution.

Next, into a pressure-resistant glass reactor equipped with a stirrer that had been subjected to nitrogen purging, 1,650 parts by weight of 2-norbornene (NB; molecular weight=94), 915 parts by weight of 5-ethyl-2-norbornene (EONB; molecular weight=122), 1,300 parts by weight of styrene as a molecular weight modifier, and 7,200 parts by weight of toluene as a polymerization solvent were charged, and the total amount (3.91 parts by weight) of the aforementioned catalyst solution was added, to initiate polymerization. After reaction at 45° C. for 4.5 hours, the polymerization reaction solution was poured into a large amount of methanol to completely precipitate a polymer, and then the polymer was filtered off and washed. Thereafter, the resultant product was dried under reduced pressure at 50° C. for 18 hours to obtain 2,462 parts by weight of a norbornene polymer 2.

The number mean molecular weight of the norbornene polymer 2 was 140,000, and the weight mean molecular weight thereof was 502,000. The composition ratio of NB units/EONB units in the norbornene polymer 2 was 61/39 (mol/mol). The glass transition temperature of the norbornene polymer 2 was 274° C. The weight mean molecular weight and the number mean molecular weight of the polymer were measured as converted values in terms of polystyrene by gel permeation chromatography (GPC) using tetrahydrofuran or chloroform as a solvent. The copolymerization ratio of the polymer was obtained by $^1$H-NMR measurement. The glass transition temperature was calculated based on the temperature at an inflection point of a storage elastic modulus E' which can be obtained by dynamic viscoelasticity measurement using DMS 6100 (manufactured by Seiko Instruments Inc.).

(11-2. Preparation of Raw Film 11)

A solution that was a mixture of 25 parts by weight of the norbornene polymer 2 and 75 parts by weight of toluene was used to prepare a raw film 11 by the solvent casting method. The thickness of the raw film 11 was 60

(11-3. Formation of Inorganic Barrier Layer)

An inorganic barrier layer was formed in the same manner as the step (1-3) of Example 1, except that the raw film 11 obtained in the aforementioned (11-2) was used in place of the stretched film 1 (that is, the raw film 11 was used without performing a stretching step). As a result, a multilayer body P11 having a layer structure of (SiOx layer)-(raw film) was obtained. The values of surface roughness Ra of the surfaces on the SiOx layer side and on the raw film side of the multilayer body P11 were measured, and found out to be 3.50 nm and 3.40 nm, respectively. The obtained multilayer body P11 was cut out to obtain two pieces each having a size of 200 mm×200 mm as a multilayer body P11-A and a multilayer body P11-B, respectively.

(11-4. Preparation of Gas Barrier Multilayer Body 11)

Surface treatment, formation of a metal alkoxide layer, and compression bonding were performed in the same manner as the steps (1-4) to (1-6) of Example 1, except that the multilayer body P11-A and the multilayer body P11-B obtained in the aforementioned (11-3) were used in place of the multilayer body P1-A and the multilayer body P1-B. As a result, a composite layer A11 (corresponding to the composite layer A-II in FIG. 8) having a layer structure of (metal alkoxide layer)-(SiOx layer)-(raw film), and a composite layer B11 (corresponding to the composite layer B-II in FIG. 8) having a layer structure of (SiOx layer)-(raw film)-(metal alkoxide layer) were obtained, and a gas barrier multilayer body 11 having a layer structure of (SiOx layer)-(raw film)-(metal alkoxide layer)-(metal alkoxide layer)-(SiOx layer)-(raw film) was further obtained.

(11-5. Evaluation)

The total film thickness of the two metal alkoxide layers of the gas barrier multilayer body 11 was 0.05 μm. The haze of the gas barrier multilayer body 11 was 0.20%. The adhesive force between the composite layers A11 and B11 of the gas barrier multilayer body 11 and the moisture permeability of the gas barrier multilayer body 11 were measured, and found out to be 4.50 N/cm and $0.20 \times 10^{-2}$ g/m$^2$/day, respectively. The peeled interface was the interface between the metal alkoxide layer and the multilayer body P11-B. The adhesive force and moisture permeability after exposure to a high temperature and high humidity environment were measured, and found out to be 4.30 N/cm and $0.20 \times 10^{-2}$ g/m$^2$/day, respectively. The peeled interface was the interface between the metal alkoxide layer and the multilayer body P11-B.

Example 12

A gas barrier multilayer body 12 having a layer structure schematically illustrated in FIG. 8 was prepared. The gas barrier multilayer body 12 has the same structure as that of the gas barrier multilayer body 1 of Example 1, except that there is a difference in the material constituting the composite layer A.

(12-1. Formation of Inorganic Barrier Layer)

A polyethylene naphthalate film (trade name "Teonex Q65FA", manufactured by Teijin DuPont Films Japan Limited) was used as a raw film 12. An SiOx layer was formed in the same manner as the step (1-3) of Example 1, except that the raw film 12 was used in place of the stretched film 1 (that is, the raw film 12 was used without performing a stretching step). As a result, a multilayer body P12 having a layer structure of (SiOx layer)-(raw film) was obtained. The values of surface roughness Ra of the surfaces on the SiOx layer side and on the raw film side of the multilayer body P12 were measured, and found out to be 2.0 nm and 2.5 nm, respectively. The obtained multilayer body P12 was cut out into a size of 200 mm×200 mm as a multilayer body P12-A.

(12-2. Preparation of composite layer A12)

Surface treatment and formation of metal alkoxide were performed in the same manner as the step (1-4) of Example 1, except that the multilayer body 212-A obtained in the aforementioned (12-1) was used in place of the multilayer body P1-A. As a result, a composite layer A12 (corresponding to the composite layer A-II in FIG. 8) having a layer structure of (metal alkoxide layer)-(SiOx layer)-(raw film) was obtained.

(12-3. Preparation of gas barrier multilayer body 12)

The composite layers A12 and B1 were bonded by compression bonding in the same manner as the step (1-6) of Example 1, except that the composite layer A12 obtained in the aforementioned (12-2) was used in place of the composite layer A1. As a result, a gas barrier multilayer body 12 having a layer structure of (SiOx layer)-(stretched film)-(metal alkoxide layer)-(metal alkoxide layer)-(SiOx layer) (raw film) was obtained.

(12-3. Evaluation)

The total film thickness of the two metal alkoxide layers of the gas barrier multilayer body 12 was 0.05 μm. The haze of the gas barrier multilayer body 12 was 0.25%. The adhesive force between the composite layers A12 and B12 of the gas barrier multilayer body 12 and the moisture permeability of the gas barrier multilayer body 12 were measured, and found out to be 4.30 N/cm and $0.30 \times 10^{-2}$ g/m$^2$/day, respectively. The peeled interface was the interface between the P12-A and the metal alkoxide layer. The adhesive force and moisture permeability after exposure to a high temperature and high humidity environment were measured, and found out to be 4.20 N/cm and $0.65 \times 10^{-2}$ g/m$^2$/day, respectively. The peeled interface was the interface between the P12-A and the metal alkoxide layer.

Example 13

A circularly polarizing plate having a gas barrier multilayer body and a polarizer was prepared.

(13-1. Preparation of Half Wave Plate Multilayer Body P13-A)

The raw film 1 obtained in the step (1-1) of Example 1 was stretched by 1.3 times in the film flow direction (the MD direction) at a stretching temperature of 172° C. using a lengthwise stretching machine, to prepare a half wave plate.

An inorganic barrier layer was formed in the same manner as the step (1-3) of Example 1, except that the half wave plate was used in place of the stretched film 1. As a result, a multilayer body having a layer structure of (SiOx layer)-(half wave plate) was obtained, and the obtained multilayer body was cut out into a size of 200 mm×200 mm, to obtain a multilayer body P13-A. Upon performing the cutting, the relationship between a slow axis and an edge was adjusted so that the angles between the slow axis of the half wave plate, the slow axes of the other layer, and the polarizing axis would become a predetermined state which will be described later.

The retardation value of the obtained multilayer body P13-A at a wavelength of 550 nm (Re(550)) was 265 nm, and the ratio of that value with respect to the retardation value at a wavelength of 450 nm (Re(450)) (i.e., Re(450))/(Re(550)) was 1.051. The values of surface roughness Ra of the surfaces on the SiOx layer side and on the half wave plate side of the multilayer body P13-A were measured, and found out to be 0.65 nm and 0.78 nm, respectively.

(13-2. Preparation of Quarter Wave Plate Multilayer Body P13-B)

The raw film 1 obtained in the step (1-1) of Example 1 was stretched by 1.5 times in the film flow direction (the MD direction) at a stretching temperature of 172° C. using a lengthwise stretching machine, to prepare a quarter wave plate.

An inorganic barrier layer was formed in the same manner as the step (1-3) of Example 1, except that the quarter wave plate was used in place of the stretched film 1. As a result, a 200 mm×200 mm multilayer body having a layer structure of (SiOx layer)-(quarter wave plate) was obtained, and the obtained multilayer body was cut out into a size of 200 mm×200 mm to obtain a multilayer body P13-B. Upon performing the cutting, the relationship between a slow axis and an edge was adjusted so that the angles between the slow axis of the quarter wave plate, the slow axes of the other layer, and the polarizing axis would become a predetermined state which will be described later.

The retardation value of the obtained multilayer body P13-B at a wavelength of 550 nm (Re(550)) was 132.5 nm, and the ratio of that value with respect to the retardation value at a wavelength of 450 nm (Re(450)) (i.e., Re(450))/(Re (550)) was 1.051. The values of surface roughness Ra of the surfaces on the SiOx layer side and on the quarter wave plate side of the multilayer body P13-B were measured, and found out to be 0.69 nm and 0.83 nm, respectively.

(13-3. Preparation of Composite Layer A13 and Composite Layer B13)

Surface treatment and formation of metal alkoxide were performed in the same manner as the steps (1-4) and (1-5) of Example 1, except that the P13-A and the P13-B obtained in the aforementioned (13-1) and (13-2) were used in place of the multilayer bodies P1-A and P1-B. As a result, a composite layer A13 having a layer structure of (metal alkoxide layer)-(SiOx layer)-(half wave plate), and a composite layer B13 having a layer structure of (SiOx layer)-(quarter wave plate)-(metal alkoxide layer) were obtained.

(13-4. Preparation of Gas Barrier Multilayer Body 13)

The composite layers A13 and B13 were bonded by compression bonding in the same manner as the step (1-6) of Example 1, except that the composite layers A13 and B13 obtained in the aforementioned (13-3) were used in place of the composite layers A1 and B1. As a result, there was obtained a gas barrier multilayer body 13 having a layer structure of (SiOx layer)-(quarter wave plate)-(metal alkoxide layer)-(metal alkoxide layer)-(SiOx layer)-(half wave plate) and having an intersection angle between the slow axis of the half wave plate and the slow axis of the quarter wave plate of 59°.

(13-5. Evaluation of Gas Barrier Multilayer Body 13)

The total film thickness of the two metal alkoxide layers of the gas barrier multilayer body 13 was 0.05 μm. The haze of the gas barrier multilayer body 13 was 0.25%. The adhesive force between the composite layers A13 and B13 of the gas barrier multilayer body 13 and the moisture permeability of the gas barrier multilayer body 13 were measured, and found out to be 4.50 N/cm and $0.20 \times 10^{-2}$ g/m$^2$/day, respectively. The peeled interface was the interface between the P13-B and the metal alkoxide layer. The adhesive force and moisture permeability after exposure to a high temperature and high humidity environment were measured, and found out to be 4.40 N/cm and $0.30 \times 10^{-2}$ g/m$^2$/day, respectively. The peeled interface was the interface between the P13-B and the metal alkoxide layer.

(13-6. Preparation of Circularly Polarizing Plate)

Corona treatment (0.15 kW, gap between electrodes 2 mm, treatment speed 1.0 m/min, and treatment width 300 mm) was performed on the surface on the half wave plate side of the obtained gas barrier multilayer body 13.

20 parts by weight of an ethyl acetate solution of a polyester-based polyurethane resin (WWA-6085 manufactured by Nippon Polyurethane Industry Co., Ltd.), 20 parts by weight of an ethyl acetate solution of a polyisocyanate (HARDENER110 manufactured by Nippon Polyurethane Industry Co., Ltd.), 0.4 parts by weight of butyl acetate, 0.4 parts by weight of cyclohexane, and 80 parts by weight of ethyl acetate were mixed to prepare a coating liquid.

The coating liquid was applied at a wet film thickness of 20 μm to the corona treated surface on the half wave plate side of the gas barrier multilayer body using a bar coater, and then dried at 85° C. for 30 minutes. As a result, a polarizing layer multilayer body 13 having a layer structure of (SiOx layer)-(quarter wave plate)-(metal alkoxide layer)-(metal alkoxide layer)-(SiOx layer)-(half wave plate)-(resin layer) was obtained.

The surface on the resin layer side of the obtained polarizing layer multilayer body 13, and the polarizer surface of an iodine-based polarizer having one surface with a TAC film stacked thereon were laminated so that an intersection angle between the slow axis of the half wave plate and the polarizing axis of the polarizing layer becomes 15°, and so that the slow axis of the quarter wave plate and the polarizing axis of the polarizing layer becomes 74°. Then, the laminated product was bonded by thermo-compression bonding at 70° C., and aged at 40° C. for 3 days, to obtain a circularly polarizing plate.

(13-7. Evaluation of Circularly Polarizing Plate)

The circularly polarizing plate was placed on a reflective liquid crystal display element having a reflection plate on the backside thereof so that the side of the quarter wave plate faces to the liquid crystal display element, and a display of the liquid crystal display element was set to black (the front surface was displayed in black). The definition of the black display viewed through the circularly polarizing plate was evaluated. Favorable properties were shown such that the black tone of the black display was uniform and deep over the entire screen.

Each of the multilayer bodies obtained in Examples 1 to 13 was favorable in adhesive force and moisture vapor barrier properties before and after a moisture and heat resistance test, and was low in haze. Therefore, the multilayer bodies were capable of being suitably used for an organic electroluminescent display device, a liquid crystal display device, and the like.

REFERENCE SIGNS LIST

100, 200, 300, 400 gas barrier multilayer body
11*a* metal alkoxide layer (a)
11*b* metal alkoxide layer (b)
12*a* inorganic barrier layer (a)
12*b* inorganic barrier layer (b)
13*a* film (a)
13*b* film (b)
A-I, A-II, A-III composite layer A
B-I, B-II composite layer B

The invention claimed is:

1. A gas barrier multilayer body comprising a composite layer A which has a film (a) and an inorganic barrier layer (a), and a composite layer B which has an alicyclic olefin resin film (b) and an inorganic barrier layer (b), wherein a surface of the composite layer A and a surface of the composite layer B are faced and bonded to each other, a surface of the alicyclic olefin resin film (b) on a side facing to the composite layer A is an activation-treated surface, and the activation-treated surface of the alicyclic olefin resin film (b) is in contact with the composite layer A directly or via a metal alkoxide layer (b); and the moisture vapor transmission rate of the gas barrier multilayer body is $1\times10^{-2}$ g/m$^2$·day or lower.

2. The gas barrier multilayer body according to claim 1, wherein the composite layer B has a metal alkoxide layer (b) disposed in contact with the activation-treated surface of the alicyclic olefin resin film (b), and the activation-treated surface of the alicyclic olefin resin film (b) is in contact with the composite layer A via the metal alkoxide layer (b).

3. The gas barrier multilayer body according to claim 1, wherein the composite layer A and the composite layer B are bonded by thermo-compression bonding.

4. The gas barrier multilayer body according to claim 1, wherein the composite layer A further has a metal alkoxide layer (a) disposed in contact with an activation-treated surface of the film (a) or the inorganic barrier layer (a), and a surface of the composite layer A on a side facing to the composite layer B is a surface of the metal alkoxide layer (a).

5. The gas barrier multilayer body according to claim 1, wherein the surface of the composite layer A on a side facing to the composite layer B is the activation-treated surface of the film (a) or the inorganic barrier layer (b).

6. The gas barrier multilayer body according to claim 1, wherein the activation-treated surface is a surface which has been subjected to a treatment selected from a group consisting of plasma treatment, UV ozone treatment, and corona treatment.

7. The gas barrier multilayer body according to claim 1, wherein the film (a) of the composite layer A is a film composed of an alicyclic olefin resin.

8. The gas barrier multilayer body according to claim 1, wherein one or both of the film (a) and the alicyclic olefin resin film (b) is/are a stretched film.

9. The gas barrier multilayer body according to claim 8, wherein one or both of the film (a) and the alicyclic olefin resin film (b) is/are a quarter wave plate.

10. The gas barrier multilayer body according to claim 9, wherein one of the film (a) and the alicyclic olefin resin film (b) is a quarter wave plate, the other thereof is a half wave plate, and an intersection angle between a slow axis of the quarter wave plate and a slow axis of the half wave plate is 57° to 63°.

11. A circularly polarizing plate comprising the gas barrier multilayer body according to claim 1 and a polarizer.

12. The gas barrier multilayer body according to claim 1, wherein the thickness of the inorganic barrier layer (a) is 3 to 500 nm.

13. The gas barrier multilayer body according to claim 1, wherein the thickness of the inorganic barrier layer (b) is 3 to 500 nm.

14. The gas barrier multilayer body according to claim 12, wherein the thickness of the inorganic barrier layer (b) is 3 to 500 nm.

15. The gas barrier multilayer body according to claim 1, wherein the material of the inorganic barrier layer (a) is an oxide, a nitride, and a nitride oxide of silicon; an oxide, a nitride, and a nitride oxide of aluminum; a diamond-like carbon; and a mixed material of two or more thereof.

16. The gas barrier multilayer body according to claim 1, wherein the material of the inorganic barrier layer (b) is an oxide, a nitride, and a nitride oxide of silicon; an oxide, a nitride, and a nitride oxide of aluminum; a diamond-like carbon; and a mixed material of two or more thereof.

17. The gas barrier multilayer body according to claim 15, wherein the material of the inorganic barrier layer (b) is an oxide, a nitride, and a nitride oxide of silicon; an oxide, a nitride, and a nitride oxide of aluminum; a diamond-like carbon; and a mixed material of two or more thereof.

18. The gas barrier multilayer body according to claim 4, wherein the thickness of the metal alkoxide layer (a) is 0.005 to 1.0 μm.

19. The gas barrier multilayer body according to claim 2, wherein the thickness of the metal alkoxide layer (b) is 0.005 to 1.0 μm.

20. The gas barrier multilayer body according to claim 18, wherein the thickness of the metal alkoxide layer (b) is 0.005 to 1.0 μm.

21. The gas barrier multilayer body according to claim 4, wherein the metal alkoxide of the metal alkoxide layer (a) contains one or more metals selected from Ti, Li, Si, Na, Mg, Ca, Ba, Al, Zn, Fe, Cu, and Zr.

22. The gas barrier multilayer body according to claim 2, wherein the metal alkoxide of the metal alkoxide layer (b) contains one or more metals selected from Ti, Li, Si, Na, Mg, Ca, Ba, Al, Zn, Fe, Cu, and Zr.

23. The gas barrier multilayer body according to claim 21, wherein the metal alkoxide of the metal alkoxide layer (b) contains one or more metals selected from Ti, Li, Si, Na, Mg, Ca, Ba, Al, Zn, Fe, Cu, and Zr.

* * * * *